US012671179B2

(12) United States Patent
Wen et al.

(10) Patent No.: US 12,671,179 B2
(45) Date of Patent: Jun. 30, 2026

(54) ELECTRONIC DEVICE WITH REAR WALL ANTENNA PARASITIC

(71) Applicant: Apple Inc., Cupertino, CA (US)

(72) Inventors: Dingliang Wen, Shenzhen (CN); Yuan Tao, Santa Clara, CA (US); Junying Liu, Shanghai (CN); Lu Zhang, Shanghai (CN); Yiren Wang, Cupertino, CA (US); Tao Wang, Cupertino, CA (US); Nikolaj P Kammersgaard, Copenhagen (DK); Erda Wen, San Diego, CA (US); Hao Xu, Cupertino, CA (US); Hongfei Hu, Cupertino, CA (US); Carlo Di Nallo, Belmont, CA (US); Mattia Pascolini, San Francisco, CA (US); Aditya Gupta, Cupertino, CA (US); Elisabeth A Lang, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/645,322

(22) Filed: Apr. 24, 2024

(65) Prior Publication Data

US 2025/0337164 A1 Oct. 30, 2025

(51) Int. Cl.
*H01Q 5/378* (2015.01)
*H01Q 1/24* (2006.01)

(52) U.S. Cl.
CPC ............. *H01Q 5/378* (2015.01); *H01Q 1/241* (2013.01)

(58) Field of Classification Search
CPC .......... H01Q 5/378; H01Q 1/241; H01Q 9/42; H01Q 1/243; H01Q 1/36; H01Q 1/22; H01Q 1/44; H01Q 1/50
See application file for complete search history.

(56) References Cited

U.S. PATENT DOCUMENTS

| | | | | |
|---|---|---|---|---|
| 6,285,327 B1 * | 9/2001 | See | H01Q 9/40 343/702 |
| 7,623,078 B2 * | 11/2009 | Wang | H01Q 1/273 343/702 |

(Continued)

FOREIGN PATENT DOCUMENTS

| | | |
|---|---|---|
| CN | 102368575 A | 3/2012 |
| CN | 204167466 U | 2/2015 |

(Continued)

*Primary Examiner* — Dameon E Levi
*Assistant Examiner* — Jordan E. DeWitt
(74) *Attorney, Agent, or Firm* — Treyz Law Group, P.C.; Michael H. Lyons

(57) ABSTRACT

An electronic device may be provided with peripheral conductive housing structures, a rear wall, and a vent that includes a conductive cowling. The device may include an antenna having an antenna arm coupled to a positive antenna feed terminal and having a parasitic element. The parasitic element may be formed from a conductive trace that is layered onto the rear wall, that is indirectly fed by the antenna arm, and that overlaps a portion of the conductive cowling. The parasitic element may be shorted to a conductive bracket on the rear wall or may be separated from the bracket by a gap. If desired, the conductive cowling may form some or all of a parasitic element for the antenna. The conductive cowling may be indirectly fed by the conductive trace and/or may include an extension that is indirectly fed by the antenna arm.

20 Claims, 13 Drawing Sheets

(56) References Cited

U.S. PATENT DOCUMENTS

| | | | | |
|---|---|---|---|---|
| 8,836,587 | B2 * | 9/2014 | Darnell | H01Q 1/50 343/702 |
| 8,963,784 | B2 * | 2/2015 | Zhu | H01Q 9/30 343/702 |
| 9,203,137 | B1 * | 12/2015 | Guterman | H01Q 1/243 |
| 9,621,230 | B2 * | 4/2017 | Ouyang | H01Q 7/00 |
| 9,893,755 | B2 * | 2/2018 | Mow | H01Q 1/48 |
| 10,476,136 | B2 * | 11/2019 | Mow | H01Q 1/48 |
| 10,476,170 | B2 | 11/2019 | Rajagopalan et al. | |
| 10,553,933 | B2 | 2/2020 | Lee et al. | |
| 10,644,401 | B2 | 5/2020 | Shang et al. | |
| 11,114,748 | B2 * | 9/2021 | Yarga | H01Q 21/28 |
| 11,909,101 | B2 * | 2/2024 | Compton | H01Q 21/245 |
| 12,476,357 | B2 * | 11/2025 | Tamrakar | H01Q 1/2283 |
| 2012/0176277 | A1 * | 7/2012 | Malek | H01Q 1/526 343/702 |
| 2015/0255853 | A1 * | 9/2015 | Kwong | H01Q 1/24 343/702 |
| 2015/0270619 | A1 * | 9/2015 | Zhu | H01Q 1/2266 343/702 |
| 2015/0311960 | A1 * | 10/2015 | Samardzija | H04B 5/26 455/90.3 |
| 2016/0104930 | A1 * | 4/2016 | Lee | H01Q 1/243 343/702 |
| 2017/0048366 | A1 * | 2/2017 | Jeong | H04M 1/0277 |
| 2017/0201011 | A1 | 7/2017 | Khripkov et al. | |
| 2018/0069308 | A1 * | 3/2018 | Durning | H01Q 5/335 |
| 2019/0393586 | A1 * | 12/2019 | Ayala Vazquez | H01Q 5/328 |
| 2021/0075088 | A1 * | 3/2021 | Edwards | H01Q 1/2283 |
| 2021/0328351 | A1 * | 10/2021 | Avser | H01Q 19/028 |
| 2021/0376453 | A1 * | 12/2021 | Han | H01Q 21/064 |
| 2021/0392739 | A1 * | 12/2021 | Hong | H01P 3/081 |
| 2024/0079757 | A1 * | 3/2024 | Amjadi | H01Q 1/243 |
| 2024/0079777 | A1 * | 3/2024 | Wang | H01Q 9/045 |
| 2024/0079778 | A1 * | 3/2024 | Ayala Vazquez | H01Q 1/243 |
| 2024/0079784 | A1 * | 3/2024 | Wang | H01Q 1/48 |
| 2024/0079785 | A1 * | 3/2024 | Wang | H01Q 9/42 |
| 2024/0079786 | A1 | 3/2024 | Wang et al. | |
| 2024/0113425 | A1 * | 4/2024 | Theofanopoulos | H01Q 1/48 |
| 2024/0356225 | A1 * | 10/2024 | Thai | H01Q 1/50 |
| 2025/0087872 | A1 * | 3/2025 | Poore | H01Q 1/48 |
| 2025/0107054 | A1 * | 3/2025 | Wang | H01Q 13/10 |
| 2025/0316903 | A1 * | 10/2025 | Amjadi | H01Q 1/243 |
| 2025/0337164 | A1 * | 10/2025 | Wen | H01Q 5/378 |

FOREIGN PATENT DOCUMENTS

| | | | |
|---|---|---|---|
| CN | 105591190 | A | 5/2016 |
| CN | 111213284 | B | 3/2022 |
| CN | 113267716 | B | 2/2024 |
| WO | 2019096376 | A1 | 5/2019 |

* cited by examiner

ELECTRONIC DEVICE WITH REAR WALL ANTENNA PARASITIC

FIELD

This relates generally to electronic devices, including electronic devices with wireless communications capabilities.

BACKGROUND

Electronic devices such as portable computers and cellular telephones are often provided with wireless communications capabilities and displays. To satisfy consumer demand for small form factor wireless devices, manufacturers are continually striving to implement wireless communications circuitry such as antenna components using compact structures. At the same time, there is a desire for wireless devices to cover a growing number of communications bands.

Because antennas have the potential to interfere with each other and with components in a wireless device, care must be taken when incorporating antennas into an electronic device. Moreover, care must be taken to ensure that the antennas and wireless circuitry in a device are able to exhibit satisfactory performance over a range of operating frequencies and with satisfactory efficiency bandwidth.

SUMMARY

An electronic device may be provided with wireless circuitry and a housing. The housing may include peripheral conductive housing structures and a rear housing wall mounted to the peripheral conductive housing structures. The electronic device may have a display mounted to the peripheral conductive housing structures opposite the rear housing wall. The rear housing wall may have a dielectric cover layer. The electronic device may have a vent that is aligned with openings in the peripheral conductive housing structures. The vent may include a conductive cowling.

The wireless circuitry may include an antenna. The antenna may include an antenna arm coupled to a positive antenna feed terminal. The antenna may include a parasitic element. The parasitic element may be formed from a conductive trace that is layered onto the dielectric cover layer, that is indirectly fed by the antenna arm, and that overlaps a portion of the conductive cowling. The parasitic element may be shorted to a conductive bracket on the dielectric cover layer or may be separated from the conductive bracket by a gap. If desired, the conductive cowling may form some or all of a parasitic element for the antenna. The conductive cowling may be indirectly fed by the conductive trace and/or may include an extension that is indirectly fed by the antenna arm. The parasitic element(s) may serve to broaden a bandwidth with which the antenna radiates through the rear housing wall.

DETAILED DESCRIPTION

Figure 1:
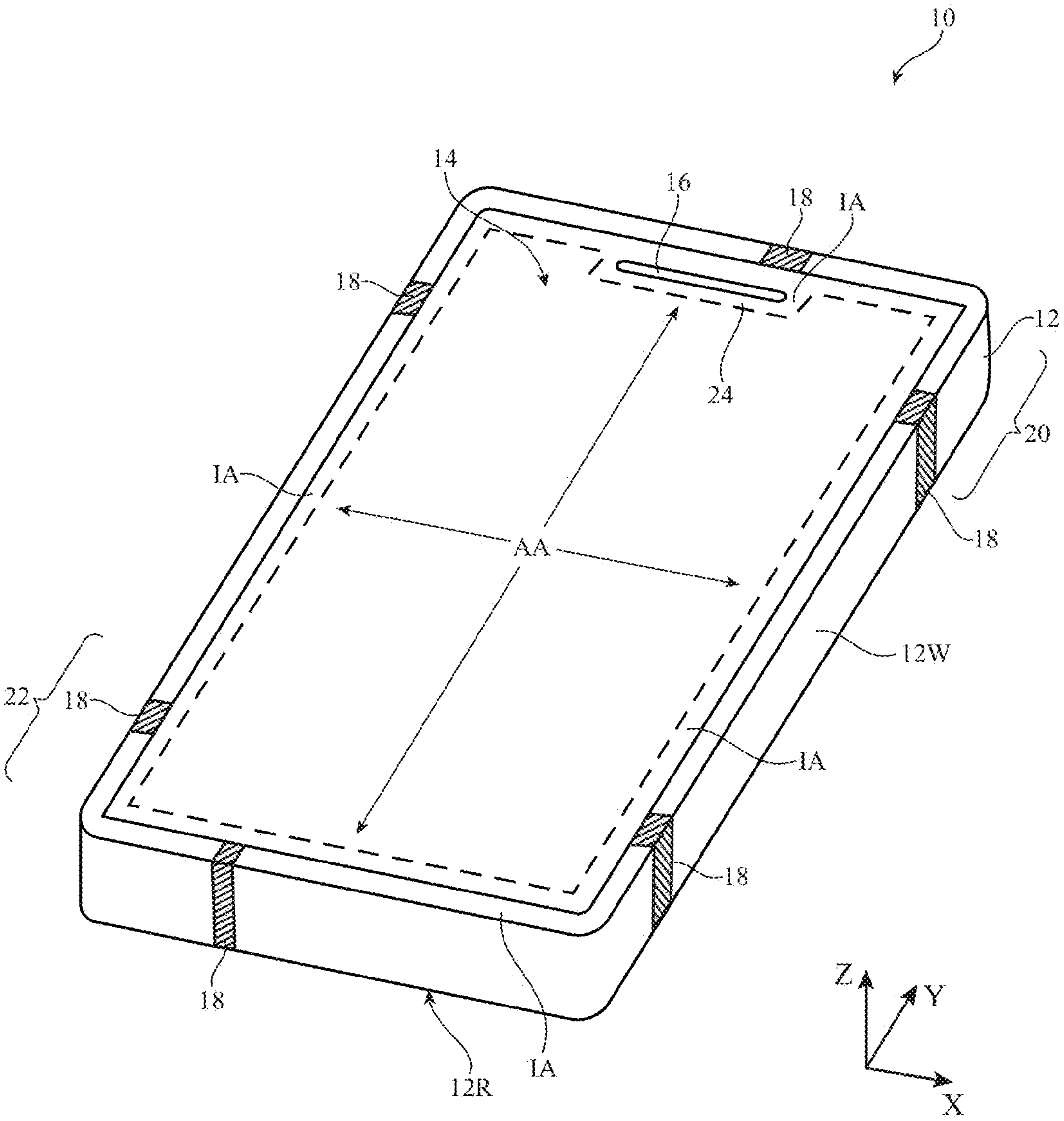
FIG. 1 is a perspective view of an illustrative electronic device in accordance with some embodiments.

An electronic device such as electronic device 10 of FIG. 1 may be provided with wireless circuitry that includes antennas. The antennas may be used to transmit and/or receive wireless radio-frequency signals.

Device 10 may be a portable electronic device or other suitable electronic device. For example, device 10 may be a laptop computer, a tablet computer, a somewhat smaller device such as a wrist-watch device, pendant device, headphone device, earpiece device, headset device (e.g., virtual, augmented, or mixed reality glasses or goggles), or another wearable or miniature device, a handheld device such as a cellular telephone, a media player, or another small portable device. Device 10 may also be a set-top box, a desktop computer, a display into which a computer or other processing circuitry has been integrated, a display without an integrated computer, a wireless access point, a wireless base station, an electronic device incorporated into a kiosk, building, or vehicle, or other suitable electronic equipment.

Device 10 may include a housing such as housing 12. Housing 12, which may sometimes be referred to as a case, may be formed of plastic, glass, ceramics, fiber composites, metal (e.g., stainless steel, aluminum, etc.), other suitable materials, or a combination of these materials. In some situations, parts of housing 12 may be formed from dielectric or other low-conductivity material (e.g., glass, ceramic, plastic, sapphire, etc.). In other situations, housing 12 or at least some of the structures that make up housing 12 may be formed from metal elements.

Device 10 may, if desired, have a display such as display 14. Display 14 may be mounted on the front face of device 10. Display 14 may be a touch screen that incorporates capacitive touch electrodes or may be insensitive to touch. The rear face of housing 12 (i.e., the face of device 10 opposing the front face of device 10) may have a substantially planar housing wall such as rear housing wall 12R (e.g., a planar housing wall). Rear housing wall 12R may have slots that pass entirely through the rear housing wall and that therefore separate portions of housing 12 from each other. Rear housing wall 12R may include conductive portions and/or dielectric portions. If desired, rear housing wall 12R may include a planar metal layer covered by a thin layer or coating of dielectric such as glass, plastic, sapphire, or ceramic (e.g., a dielectric cover layer). Housing 12 may also have shallow grooves that do not pass entirely through housing 12. The slots and grooves may be filled with plastic or other dielectric materials. If desired, portions of housing 12 that have been separated from each other (e.g., by a through slot) may be joined by internal conductive structures (e.g., sheet metal or other metal members that bridge the slot).

Housing 12 may include peripheral housing structures such as peripheral structures 12W. Conductive portions of peripheral structures 12W and conductive portions of rear housing wall 12R may sometimes be referred to herein collectively as conductive structures of housing 12. Peripheral structures 12W may run around the periphery of device 10 and display 14. In configurations in which device 10 and display 14 have a rectangular shape with four edges, peripheral structures 12W may be implemented using peripheral housing structures that have a rectangular ring shape with four corresponding edges and that extend from rear housing wall 12R to the front face of device 10 (as an example). In other words, device 10 may have a length (e.g., measured parallel to the Y-axis), a width that is less than the length (e.g., measured parallel to the X-axis), and a height (e.g., measured parallel to the Z-axis) that is less than the width. Peripheral structures 12W or part of peripheral structures 12W may serve as a bezel for display 14 (e.g., a cosmetic trim that surrounds all four sides of display 14 and/or that helps hold display 14 to device 10) if desired. Peripheral structures 12W may, if desired, form sidewall structures for device 10 (e.g., by forming a metal band with vertical sidewalls, curved sidewalls, etc.).

Peripheral structures 12W may be formed from a conductive material such as metal and may therefore sometimes be referred to as peripheral conductive housing structures, conductive housing structures, peripheral metal structures, peripheral conductive sidewalls, peripheral conductive sidewall structures, conductive housing sidewalls, peripheral conductive housing sidewalls, sidewalls, sidewall structures, or a peripheral conductive housing member (as examples). Peripheral conductive housing structures 12W may be formed from a metal such as stainless steel, aluminum, alloys, or other suitable materials. One, two, or more than two separate structures may be used in forming peripheral conductive housing structures 12W.

It is not necessary for peripheral conductive housing structures 12W to have a uniform cross-section. For example, the top portion of peripheral conductive housing structures 12W may, if desired, have an inwardly protruding ledge that helps hold display 14 in place. The bottom portion of peripheral conductive housing structures 12W may also have an enlarged lip (e.g., in the plane of the rear surface of device 10). Peripheral conductive housing structures 12W may have substantially straight vertical sidewalls, may have sidewalls that are curved, or may have other suitable shapes. In some configurations (e.g., when peripheral conductive housing structures 12W serve as a bezel for display 14), peripheral conductive housing structures 12W may run around the lip of housing 12 (i.e., peripheral conductive housing structures 12W may cover only the edge of housing 12 that surrounds display 14 and not the rest of the sidewalls of housing 12).

Rear housing wall 12R may lie in a plane that is parallel to display 14. In configurations for device 10 in which some or all of rear housing wall 12R is formed from metal, it may be desirable to form parts of peripheral conductive housing structures 12W as integral portions of the housing structures forming rear housing wall 12R. For example, rear housing wall 12R of device 10 may include a planar metal structure and portions of peripheral conductive housing structures 12W on the sides of housing 12 may be formed as flat or curved vertically extending integral metal portions of the planar metal structure (e.g., housing structures 12R and 12W may be formed from a continuous piece of metal in a unibody configuration). Housing structures such as these may, if desired, be machined from a block of metal and/or may include multiple metal pieces that are assembled together to form housing 12. Rear housing wall 12R may have one or more, two or more, or three or more portions. Peripheral conductive housing structures 12W and/or conductive portions of rear housing wall 12R may form one or more exterior surfaces of device 10 (e.g., surfaces that are visible to a user of device 10) and/or may be implemented using internal structures that do not form exterior surfaces of device 10 (e.g., conductive housing structures that are not visible to a user of device 10 such as conductive structures that are covered with layers such as thin cosmetic layers, protective coatings, and/or other coating/cover layers that may include dielectric materials such as glass, ceramic, plastic, or other structures that form the exterior surfaces of device 10 and/or serve to hide peripheral conductive housing structures 12W and/or conductive portions of rear housing wall 12R from view of the user).

Display 14 may have an array of pixels that form an active area AA that displays images for a user of device 10. For example, active area AA may include an array of display pixels. The array of pixels may be formed from liquid crystal display (LCD) components, an array of electrophoretic pixels, an array of plasma display pixels, an array of organic light-emitting diode display pixels or other light-emitting diode pixels, an array of electrowetting display pixels, or display pixels based on other display technologies. If desired, active area AA may include touch sensors such as touch sensor capacitive electrodes, force sensors, or other sensors for gathering a user input.

Display 14 may have an inactive border region that runs along one or more of the edges of active area AA. Inactive area IA of display 14 may be free of pixels for displaying images and may overlap circuitry and other internal device structures in housing 12. To block these structures from view by a user of device 10, the underside of the display cover layer or other layers in display 14 that overlap inactive area IA may be coated with an opaque masking layer in inactive area IA. The opaque masking layer may have any suitable color. Inactive area IA may include a recessed region such as notch 24 that extends into active area AA. Active area AA may, for example, be defined by the lateral area of a display module for display 14 (e.g., a display module that includes pixel circuitry, touch sensor circuitry, etc.). The display module may have a recess or notch in upper region 20 of device 10 that is free from active display circuitry (i.e., that forms notch 24 of inactive area IA). Notch 24 may be a substantially rectangular region that is surrounded (defined) on three sides by active area AA and on a fourth side by peripheral conductive housing structures 12W. Alternatively, notch 24 may be defined on all sides by (e.g., may be surrounded and enclosed by) active area AA (e.g., notch 24 may form an inactive island in the pixel circuitry of display 14). One or more sensors may be aligned with notch 24 and may transmit and/or receive light through display 14 within notch 24.

Display 14 may be protected using a display cover layer such as a layer of transparent glass, clear plastic, transparent ceramic, sapphire, or other transparent crystalline material, or other transparent layer(s). The display cover layer may have a planar shape, a convex curved profile, a shape with planar and curved portions, a layout that includes a planar main area surrounded on one or more edges with a portion that is bent out of the plane of the planar main area, or other suitable shapes. The display cover layer may cover the entire front face of device 10. In another suitable arrangement, the display cover layer may cover substantially all of the front face of device 10 or only a portion of the front face of device 10. Openings may be formed in the display cover layer. For example, an opening may be formed in the display cover layer to accommodate a button. An opening may also be formed in the display cover layer to accommodate ports such as speaker port 16 in notch 24 or a microphone port. Openings may be formed in housing 12 to form communications ports (e.g., an audio jack port, a digital data port, etc.) and/or audio ports for audio components such as a speaker and/or a microphone if desired.

Display 14 may include conductive structures such as an array of capacitive electrodes for a touch sensor, conductive lines for addressing pixels, driver circuits, etc. Housing 12 may include internal conductive structures such as metal frame members and a planar conductive housing member (sometimes referred to as a conductive support plate or backplate) that spans the walls of housing 12 (e.g., a substantially rectangular sheet formed from one or more metal parts that is welded or otherwise connected between opposing sides of peripheral conductive housing structures 12W). The conductive support plate may form an exterior rear surface of device 10 or may be covered by a dielectric cover layer such as a thin cosmetic layer, protective coating, and/or other coatings that may include dielectric materials such as glass, ceramic, plastic, or other structures that form the exterior surfaces of device 10 and/or serve to hide the conductive support plate from view of the user (e.g., the conductive support plate may form part of rear housing wall 12R). Device 10 may also include conductive structures such as printed circuit boards, components mounted on printed circuit boards, and other internal conductive structures. These conductive structures, which may be used in forming a ground plane in device 10, may extend under active area AA of display 14, for example.

In regions 22 and 20, openings may be formed within the conductive structures of device 10 (e.g., between peripheral conductive housing structures 12W and opposing conductive ground structures such as conductive portions of rear housing wall 12R, conductive traces on a printed circuit board, conductive electrical components in display 14, etc.). These openings, which may sometimes be referred to as gaps, may be filled with air, plastic, and/or other dielectrics and may be used in forming slot antenna resonating elements for one or more antennas in device 10, if desired.

Conductive housing structures and other conductive structures in device 10 may serve as a ground plane for the antennas in device 10. The openings in regions 22 and 20 may serve as slots in open or closed slot antennas, may serve as a central dielectric region that is surrounded by a conductive path of materials in a loop antenna, may serve as a space that separates an antenna resonating element such as a strip antenna resonating element or an inverted-F antenna resonating element from the ground plane, may contribute to the performance of a parasitic antenna resonating element, or may otherwise serve as part of antenna structures formed in regions 22 and 20. If desired, the ground plane that is under active area AA of display 14 and/or other metal structures in device 10 may have portions that extend into parts of the ends of device 10 (e.g., the ground may extend towards the dielectric-filled openings in regions 22 and 20), thereby narrowing the slots in regions 22 and 20. Region 22 may sometimes be referred to herein as lower region 22 or lower end 22 of device 10. Region 20 may sometimes be referred to herein as upper region 20 or upper end 20 of device 10.

In general, device 10 may include any suitable number of antennas (e.g., one or more, two or more, three or more, four or more, etc.). The antennas in device 10 may be located at opposing first and second ends of an elongated device housing (e.g., at lower region 22 and/or upper region 20 of device 10 of FIG. 1), along one or more edges of a device housing, in the center of a device housing, in other suitable locations, or in one or more of these locations. The arrangement of FIG. 1 is illustrative and non-limiting.

Portions of peripheral conductive housing structures 12W may be provided with peripheral gap structures. For example, peripheral conductive housing structures 12W may be provided with one or more dielectric-filled gaps such as gaps 18, as shown in FIG. 1. The gaps in peripheral conductive housing structures 12W may be filled with dielectric such as polymer, ceramic, glass, air, other dielectric materials, or combinations of these materials. Gaps 18 may divide peripheral conductive housing structures 12W into one or more peripheral conductive segments. The conductive segments that are formed in this way may form parts of antennas in device 10 if desired. Other dielectric openings may be formed in peripheral conductive housing structures 12W (e.g., dielectric openings other than gaps 18) and may serve as dielectric antenna windows for antennas mounted within the interior of device 10. Antennas within device 10 may be aligned with the dielectric antenna windows for conveying radio-frequency signals through peripheral conductive housing structures 12W. Antennas within device 10 may also be aligned with inactive area IA of display 14 for conveying radio-frequency signals through display 14.

To provide an end user of device 10 with as large of a display as possible (e.g., to maximize an area of the device used for displaying media, running applications, etc.), it may be desirable to increase the amount of area at the front face of device 10 that is covered by active area AA of display 14. Increasing the size of active area AA may reduce the size of inactive area IA within device 10. This may reduce the area behind display 14 that is available for antennas within device 10. For example, active area AA of display 14 may include conductive structures that serve to block radio-frequency signals handled by antennas mounted behind active area AA from radiating through the front face of device 10. It would therefore be desirable to be able to provide antennas that occupy a small amount of space within device 10 (e.g., to allow for as large of a display active area AA as possible) while still allowing the antennas to communicate with wireless equipment external to device 10 with satisfactory efficiency bandwidth.

In a typical scenario, device 10 may have one or more upper antennas and one or more lower antennas. An upper antenna may, for example, be formed in upper region 20 of device 10. A lower antenna may, for example, be formed in lower region 22 of device 10. Additional antennas may be formed along the edges of housing 12 extending between regions 20 and 22 if desired. The antennas may be used separately to cover identical communications bands, overlapping communications bands, or separate communications bands. The antennas may be used to implement an antenna diversity scheme or a multiple-input-multiple-output (MIMO) antenna scheme. Other antennas for covering any other desired frequencies may also be mounted at any desired locations within the interior of device 10. The example of FIG. 1 is illustrative and non-limiting. If desired, housing 12 may have other shapes (e.g., a square shape, cylindrical shape, spherical shape, combinations of these and/or different shapes, etc.).

Figure 2:
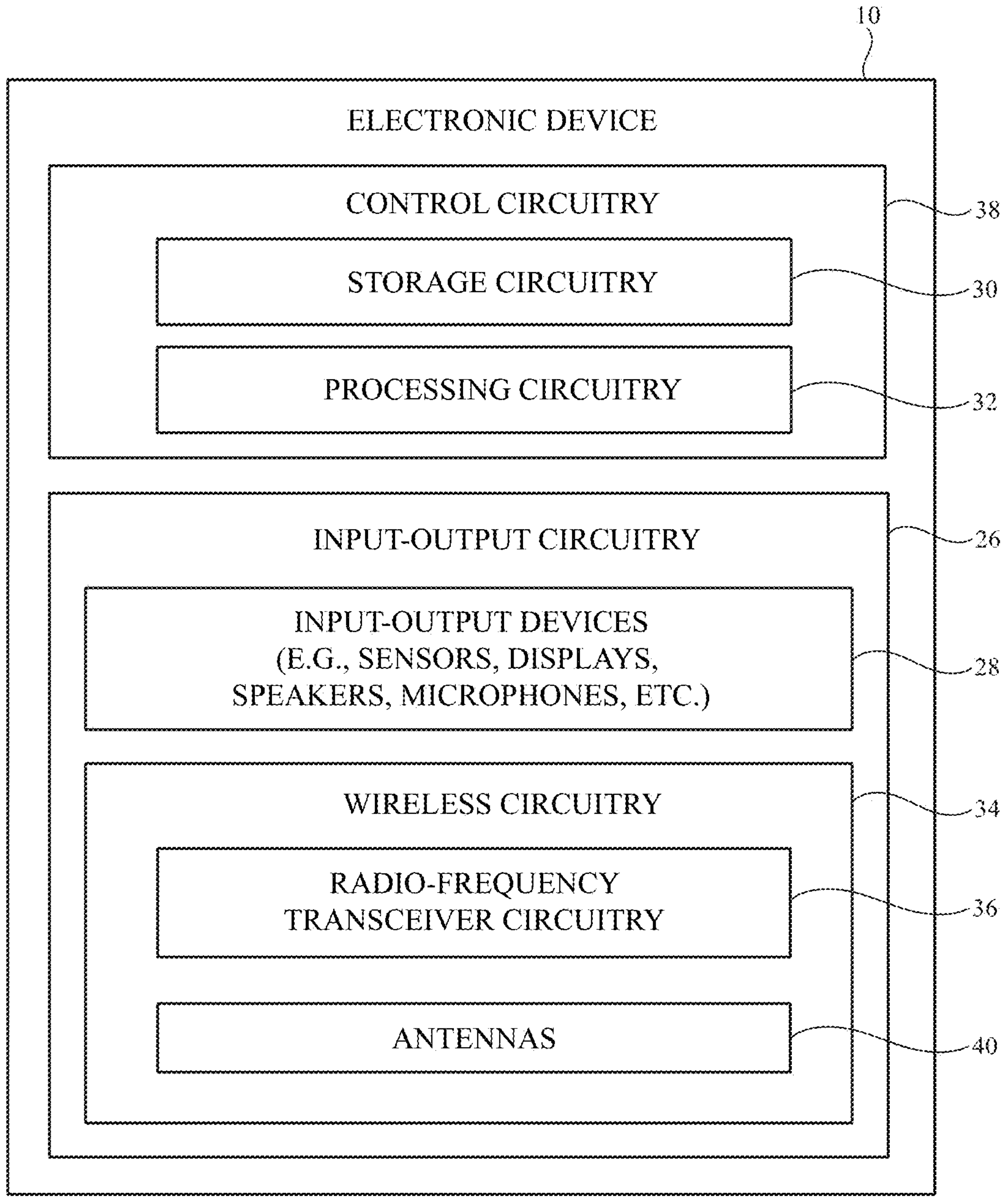
FIG. 2 is a schematic diagram of illustrative circuitry in an electronic device in accordance with some embodiments.

A schematic diagram of illustrative components that may be used in device 10 is shown in FIG. 2. As shown in FIG. 2, device 10 may include control circuitry 38. Control circuitry 38 may include storage such as storage circuitry 30. Storage circuitry 30 may include hard disk drive storage, nonvolatile memory (e.g., flash memory or other electrically-programmable-read-only memory configured to form a solid-state drive), volatile memory (e.g., static or dynamic random-access-memory), etc.

Control circuitry 38 may include processing circuitry such as processing circuitry 32. Processing circuitry 32 may be used to control the operation of device 10. Processing circuitry 32 may include one or more processors such as microprocessors, microcontrollers, digital signal processors, host processors, baseband processor integrated circuits, application specific integrated circuits, graphics processing units, central processing units (CPUs), etc. Control circuitry 38 may be configured to perform operations in device 10 using hardware (e.g., dedicated hardware or circuitry), firmware, and/or software. Software code for performing operations in device 10 may be stored on storage circuitry 30 (e.g., storage circuitry 30 may include non-transitory (tangible) computer readable storage media that stores the software code). The software code may sometimes be referred to as program instructions, software, data, instructions, or code. Software code stored on storage circuitry 30 may be executed by processing circuitry 32.

Control circuitry 38 may be used to run software on device 10 such as internet browsing applications, voice-over-internet-protocol (VOIP) telephone call applications, email applications, media playback applications, operating system functions, etc. To support interactions with external equipment, control circuitry 38 may be used in implementing communications protocols. Communications protocols that may be implemented using control circuitry 38 include internet protocols, wireless local area network protocols (e.g., IEEE 802.11 protocols-sometimes referred to as Wi-Fi®), protocols for other short-range wireless communications links such as the Bluetooth® protocol or other WPAN protocols, IEEE 802.11ad protocols, cellular telephone protocols, MIMO protocols, antenna diversity protocols, satellite navigation system protocols, antenna-based spatial ranging protocols (e.g., radio detection and ranging (RADAR) protocols or other desired range detection protocols for signals conveyed at millimeter and centimeter wave frequencies), etc. Each communication protocol may be associated with a corresponding radio access technology (RAT) that specifies the physical connection methodology used in implementing the protocol.

Device 10 may include input-output circuitry 26. Input-output circuitry 26 may include input-output devices 28. Input-output devices 28 may be used to allow data to be supplied to device 10 and to allow data to be provided from device 10 to external devices. Input-output devices 28 may include user interface devices, data port devices, sensors, and other input-output components. For example, input-output devices 28 may include touch screens, displays without touch sensor capabilities, buttons, joysticks, scrolling wheels, touch pads, key pads, keyboards, microphones, cameras, speakers, status indicators, light sources, audio jacks and other audio port components, digital data port devices, light sensors, gyroscopes, accelerometers or other components that can detect motion and device orientation relative to the Earth, capacitance sensors, proximity sensors (e.g., a capacitive proximity sensor and/or an infrared proximity sensor), magnetic sensors, and other sensors and input-output components. The sensors in input-output devices 28 may include front-facing sensors that gather sensor data through display 14. The front-facing sensors may be optical sensors. The optical sensors may include an image sensor (e.g., a front-facing camera), an infrared sensor, and/or an ambient light sensor. The infrared sensor may include one or more infrared emitters (e.g., a dot projector and a flood illuminator) and/or one or more infrared image sensors.

Input-output circuitry 26 may include wireless circuitry such as wireless circuitry 34 for wirelessly conveying radio-frequency signals. While control circuitry 38 is shown separately from wireless circuitry 34 in the example of FIG. 2 for the sake of clarity, wireless circuitry 34 may include processing circuitry that forms a part of processing circuitry 32 and/or storage circuitry that forms a part of storage circuitry 30 of control circuitry 38 (e.g., portions of control circuitry 38 may be implemented on wireless circuitry 34). As an example, control circuitry 38 may include baseband processor circuitry or other control components that form a part of wireless circuitry 34.

Wireless circuitry 34 may include radio-frequency (RF) transceiver circuitry formed from one or more integrated circuits, power amplifier circuitry, low-noise input amplifiers, passive RF components, one or more antennas, transmission lines, and other circuitry for handling RF wireless signals. Wireless signals can also be sent using light (e.g., using infrared communications).

Wireless circuitry 34 may include radio-frequency transceiver circuitry 36 for handling transmission and/or reception of radio-frequency signals within corresponding frequency bands at radio frequencies (sometimes referred to herein as communications bands or simply as “bands”). The frequency bands handled by radio-frequency transceiver circuitry 36 may include wireless local area network (WLAN) frequency bands (e.g., Wi-Fi® (IEEE 802.11) or other WLAN communications bands) such as a 2.4 GHz WLAN band (e.g., from 2400 to 2480 MHz), a 5 GHz WLAN band (e.g., from 5180 to 5825 MHz), a Wi-Fi® 6E band (e.g., from 5925-7125 MHz), and/or other Wi-Fi® bands (e.g., from 1875-5160 MHz), wireless personal area network (WPAN) frequency bands such as the 2.4 GHz Bluetooth® band or other WPAN communications bands, cellular telephone communications bands such as a cellular low band (LB) (e.g., 600 to 960 MHz), a cellular low-midband (LMB) (e.g., 1400 to 1550 MHz), a cellular midband (MB) (e.g., from 1700 to 2200 MHz), a cellular high band (HB) (e.g., from 2300 to 2700 MHZ), a cellular ultra-high band (UHB) (e.g., from 3300 to 5000 MHz, or other cellular communications bands between about 600 MHz and about 5000 MHz), 3G bands, 4G LTE bands, 3GPP 5G New Radio Frequency Range 1 (FR1) bands below 10 GHZ, 3GPP 5G New Radio (NR) Frequency Range 2 (FR2) bands between 20 and 60 GHz, other centimeter or millimeter wave frequency bands between 10-300 GHz, near-field communications frequency bands (e.g., at 13.56 MHZ), satellite navigation frequency bands such as the Global Positioning System (GPS) L1 band (e.g., at 1575 MHz), L2 band (e.g., at 1228 MHz), L3 band (e.g., at 1381 MHz), L4 band (e.g., at 1380 MHz), and/or L5 band (e.g., at 1176 MHz), a Global Navigation Satellite System (GLONASS) band, a BeiDou Navigation Satellite System (BDS) band, ultra-wideband (UWB) frequency bands that operate under the IEEE 802.15.4 protocol and/or other ultra-wideband communications protocols (e.g., a first UWB communications band at 6.5 GHz and/or a second UWB communications band at 8.0 GHz), communications bands under the family of 3GPP wireless communications standards, communications bands under the IEEE 802.XX family of standards, satellite communications bands such as an L-band, S-band (e.g., from 2-4 GHZ), C-band (e.g., from 4-8 GHZ), X-band, Ku-band (e.g., from 12-18 GHz), Ka-band (e.g., from 26-40 GHz), etc., industrial, scientific, and medical (ISM) bands such as an ISM band between around 900 MHz and 950 MHz or other ISM bands below or above 1 GHz, one or more unlicensed bands, one or more bands reserved for emergency and/or public services, and/or any other desired frequency bands of interest. Wireless circuitry 34 may also be used to perform spatial ranging operations if desired.

UWB communications handled by radio-frequency transceiver circuitry 36 may be based on an impulse radio signaling scheme that uses band-limited data pulses. Radio-frequency signals in the UWB frequency band may have any desired bandwidths such as bandwidths between 499 MHz and 1331 MHz, bandwidths greater than 500 MHZ, etc. The presence of lower frequencies in the baseband may sometimes allow ultra-wideband signals to penetrate through objects such as walls. In an IEEE 802.15.4 system, for example, a pair of electronic devices may exchange wireless time stamped messages. Time stamps in the messages may be analyzed to determine the time of flight of the messages and thereby determine the distance (range) between the devices and/or an angle between the devices (e.g., an angle of arrival of incoming radio-frequency signals).

Radio-frequency transceiver circuitry 36 may include respective transceivers (e.g., transceiver integrated circuits or chips) that handle each of these frequency bands or any desired number of transceivers that handle two or more of these frequency bands. In scenarios where different transceivers are coupled to the same antenna, filter circuitry (e.g., duplexer circuitry, diplexer circuitry, low pass filter circuitry, high pass filter circuitry, band pass filter circuitry, band stop filter circuitry, etc.), switching circuitry, multiplexing circuitry, or any other desired circuitry may be used to isolate radio-frequency signals conveyed by each transceiver over the same antenna (e.g., filtering circuitry or multiplexing circuitry may be interposed on a radio-frequency transmission line shared by the transceivers). Radio-frequency transceiver circuitry 36 may include one or more integrated circuits (chips), integrated circuit packages (e.g., multiple integrated circuits mounted on a common printed circuit in a system-in-package device, one or more integrated circuits mounted on different substrates, etc.), power amplifier circuitry, up-conversion circuitry, down-conversion circuitry, low-noise input amplifiers, passive radio-frequency components, switching circuitry, transmission line structures, and other circuitry for handling radio-frequency signals and/or for converting signals between radio-frequencies, intermediate frequencies, and/or baseband frequencies.

In general, radio-frequency transceiver circuitry 36 may cover (handle) any desired frequency bands of interest. As shown in FIG. 2, wireless circuitry 34 may include antennas 40. Radio-frequency transceiver circuitry 36 may convey radio-frequency signals using one or more antennas 40 (e.g., antennas 40 may convey the radio-frequency signals for the transceiver circuitry). The term "convey radio-frequency signals" as used herein means the transmission and/or reception of the radio-frequency signals (e.g., for performing unidirectional and/or bidirectional wireless communications with external wireless communications equipment). Antennas 40 may transmit the radio-frequency signals by radiating the radio-frequency signals into free space (or to freespace through intervening device structures such as a dielectric cover layer). Antennas 40 may additionally or alternatively receive the radio-frequency signals from free space (e.g., through intervening devices structures such as a dielectric cover layer). The transmission and reception of radio-frequency signals by antennas 40 each involve the excitation or resonance of antenna currents on an antenna resonating element in the antenna by the radio-frequency signals within the frequency band(s) of operation of the antenna.

Antennas 40 in wireless circuitry 34 may be formed using any suitable antenna structures. For example, antennas 40 may include antennas with resonating elements that are formed from stacked patch antenna structures, loop antenna structures, patch antenna structures, inverted-F antenna structures, slot antenna structures, planar inverted-F antenna structures, waveguide structures, monopole antenna structures, dipole antenna structures, helical antenna structures, Yagi (Yagi-Uda) antenna structures, hybrids of these designs, etc. If desired, antennas 40 may include antennas with dielectric resonating elements such as dielectric resonator antennas. If desired, one or more of antennas 40 may be cavity-backed antennas. Two or more antennas 40 may be arranged in a phased antenna array if desired (e.g., for conveying centimeter and/or millimeter wave signals within a signal beam formed in a desired beam pointing direction that may be steered/adjusted over time). Different types of antennas may be used for different bands and combinations of bands.

Figure 3:
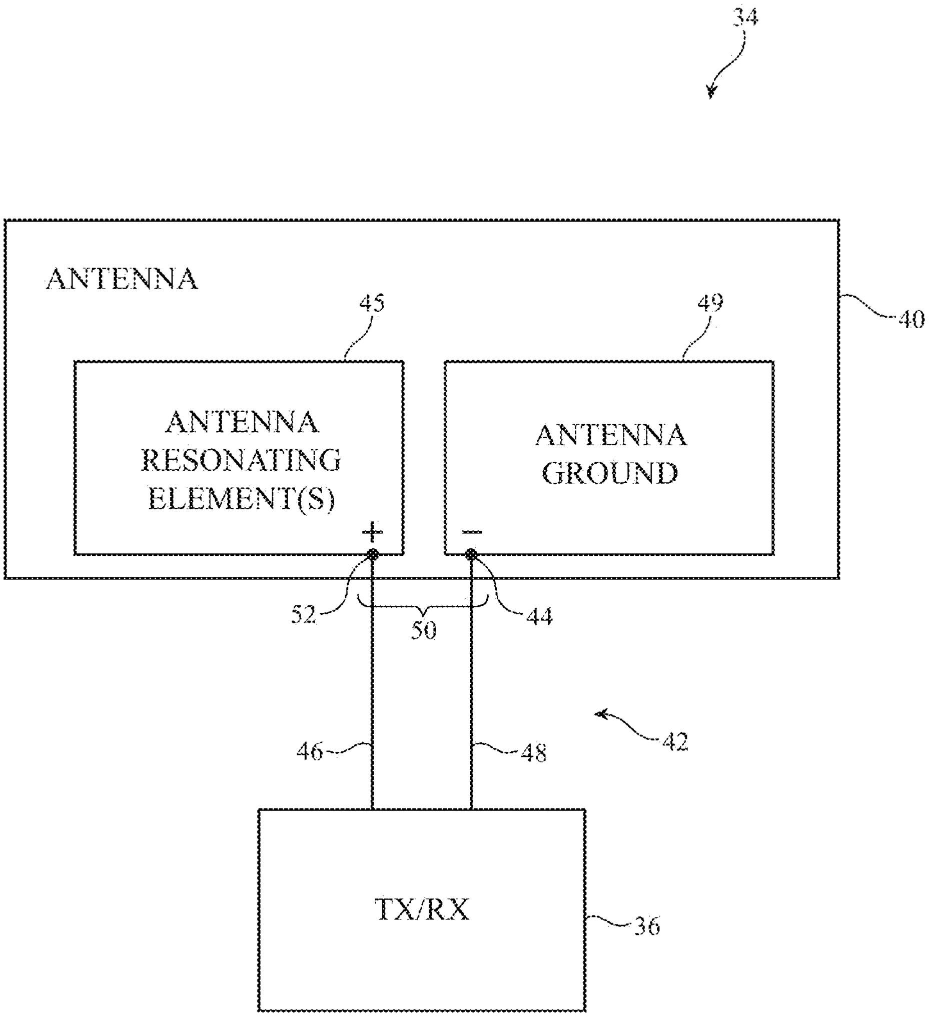
FIG. 3 is a schematic diagram of illustrative wireless circuitry in accordance with some embodiments.

FIG. 3 is a schematic diagram showing how a given antenna 40 may be fed by radio-frequency transceiver circuitry 36. As shown in FIG. 3, antenna 40 may have a corresponding antenna feed 50. Antenna 40 may include one or more antenna resonating (radiating) elements 45 and an antenna ground 49. Antenna resonating element(s) 45 may include one or more radiating arms, slots, waveguides, dielectric resonators, patches, parasitic elements, indirect feed elements, and/or any other desired antenna radiators. Antenna feed 50 may include a positive antenna feed terminal 52 coupled to at least one antenna resonating element 45 and a ground antenna feed terminal 44 coupled to antenna ground 49. If desired, one or more conductive paths (sometimes referred to herein as ground paths, short paths, or return paths) may couple antenna resonating element(s) 45 to antenna ground 49.

Radio-frequency transceiver (TX/RX) circuitry 36 may be coupled to antenna feed 50 using a radio-frequency transmission line path 42 (sometimes referred to herein as transmission line path 42). Transmission line path 42 may include a signal conductor such as signal conductor 46 (e.g., a positive signal conductor). Transmission line path 42 may include a ground conductor such as ground conductor 48. Ground conductor 48 may be coupled to ground antenna feed terminal 44 of antenna feed 50. Signal conductor 46 may be coupled to positive antenna feed terminal 52 of antenna feed 50.

Transmission line path 42 may include one or more radio-frequency transmission lines. The radio-frequency transmission line(s) in transmission line path 42 may include stripline transmission lines (sometimes referred to herein simply as striplines), coaxial cables, coaxial probes realized by metalized vias, microstrip transmission lines, edge-coupled microstrip transmission lines, edge-coupled stripline transmission lines, waveguide structures, combinations of these, etc. Multiple types of radio-frequency transmission line may be used to form transmission line path 42. Filter circuitry, switching circuitry, impedance matching circuitry, phase shifter circuitry, amplifier circuitry, and/or other circuitry may be interposed on transmission line path 42, if desired. One or more antenna tuning components for adjusting the frequency response of antenna 40 in one or more bands may be interposed on transmission line path 42 and/or may be integrated within antenna 40 (e.g., coupled between the antenna ground and the antenna resonating element of antenna 40, coupled between different portions of the antenna resonating element of antenna 40, etc.).

If desired, one or more of the radio-frequency transmission lines in transmission line path 42 may be integrated into ceramic substrates, rigid printed circuit boards, and/or flexible printed circuits. In one suitable arrangement, the radio-frequency transmission lines may be integrated within multilayer laminated structures (e.g., layers of a conductive material such as copper and a dielectric material such as a resin that are laminated together without intervening adhesive) that may be folded or bent in multiple dimensions (e.g., two or three dimensions) and that maintain a bent or folded shape after bending (e.g., the multilayer laminated structures may be folded into a particular three-dimensional shape to route around other device components and may be rigid enough to hold its shape after folding without being held in place by stiffeners or other structures). All the multiple layers of the laminated structures may be batch laminated together (e.g., in a single pressing process) without adhesive (e.g., as opposed to performing multiple pressing processes to laminate multiple layers together with adhesive).

Figure 4:
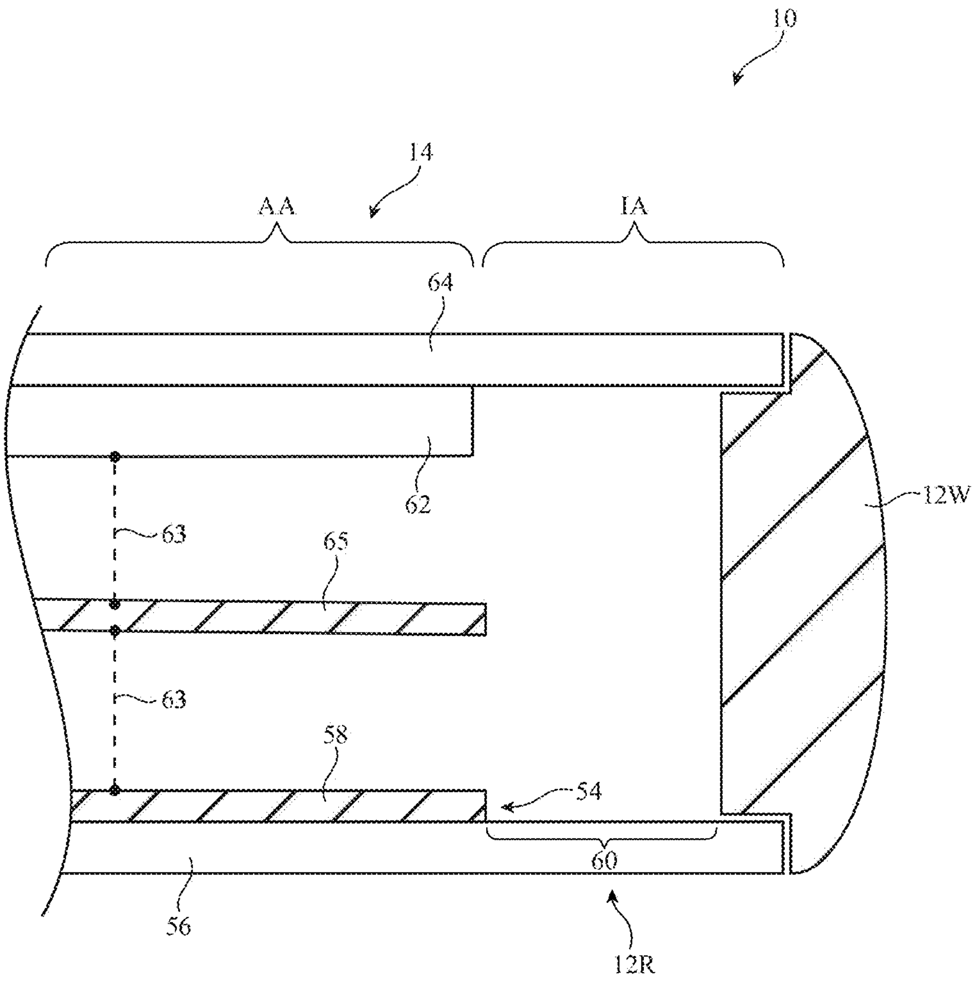
FIG. 4 is a cross-sectional side view of an electronic device having housing structures that may be used in forming antenna structures in accordance with some embodiments.

If desired, conductive electronic device structures such as conductive portions of housing 12 (FIG. 1) may be used to form at least part of one or more of the antennas 40 in device 10. FIG. 4 is a cross-sectional side view of device 10, showing illustrative conductive electronic device structures that may be used in forming one or more of the antennas 40 in device 10.

As shown in FIG. 4, peripheral conductive housing structures 12W may extend around the lateral periphery of device 10 (e.g., as measured in the X-Y plane of FIG. 1). Peripheral conductive housing structures 12W may extend from rear housing wall 12R (e.g., at the rear face of device 10) to display 14 (e.g., at the front face of device 10). In other words, peripheral conductive housing structures 12W may form conductive sidewalls for device 10, a first of which is shown in the cross-sectional side view of FIG. 4 (e.g., a given sidewall that runs along an edge of device 10 and that extends across the width or length of device 10).

Display 14 may have a display module such as display module 62 (sometimes referred to as a display panel). Display module 62 may include pixel circuitry, touch sensor circuitry, force sensor circuitry, and/or any other desired circuitry for forming active area AA of display 14. Display 14 may include a dielectric cover layer such as display cover layer 64 that overlaps display module 62. Display cover layer 64 may include plastic, glass, sapphire, ceramic, and/or any other desired dielectric materials. Display module 62 may emit image light and may receive sensor input (e.g., touch and/or force sensor input) through display cover layer 64. Display cover layer 64 and display 14 may be mounted to peripheral conductive housing structures 12W. The lateral area of display 14 that does not overlap display module 62 may form inactive area IA of display 14.

As shown in FIG. 4, rear housing wall 12R may be mounted to peripheral conductive housing structures 12W (e.g., opposite display 14). Rear housing wall 12R may include a dielectric cover layer such as dielectric cover layer 56. Dielectric cover layer 56 may include glass, plastic, sapphire, ceramic, one or more dielectric coatings, or other dielectric materials, and is sometimes also referred to herein as back glass (BG) 56. If desired, conductive material may be layered onto some of the interior lateral surface of dielectric cover layer 56. Dielectric cover layer 56 may extend across an entirety of the width of device 10 and/or an entirety of the length of device 10. If desired, dielectric cover layer 56 may be provided with pigmentation and/or an opaque masking layer (e.g., an ink layer) that helps to hide the interior of device 10 from view.

The housing for device 10 may also include one or more conductive support plates interposed between display 14 and rear housing wall 12R. For example, the housing for device 10 may include a first conductive support plate such as conductive support plate 58 and/or may include a second support plate such as conductive support plate 65. Conductive support plate 58 is vertically interposed between dielectric cover layer 56 and display module 62. Conductive support plate 65 is vertically interposed between conductive support plate 58 and display module 62. Conductive support plate 58 is sometimes also referred to herein as conductive lower chassis 58, lower chassis 58, conductive lower plate 58, lower plate 58, lower interior conductive housing wall 58, conductive layer 58, lower conductive layer 58, or lower conductive support plate 58. Conductive support plate 65 is sometimes also referred to herein as conductive mid-chassis 65, mid-chassis 65, conductive mid-plate 65, mid-plate 65, upper interior conductive housing wall 65, conductive layer 65, upper conductive layer 65, or upper conductive support plate 65.

Conductive support plate 58 may be layered onto dielectric cover layer 56 without adhesive that adheres conductive support plate 58 to dielectric cover layer 56 or may be separated from dielectric cover layer 56 by a non-zero distance (e.g., an air gap). This may, for example, allow dielectric cover layer 56 and/or rear housing wall 12R to be easily removed from device 10 (e.g., to repair and/or replace components within the interior of device 10). Alternatively, conductive support plate 58 may be adhered to dielectric cover layer 56 (e.g., may form a part of rear housing wall 12R). Alternatively, conductive support plate 58 may be omitted. Mid-chassis 65 may be located at a first distance from display 14 whereas conductive support plate 58 is located at a second distance that is greater than the first distance from display 14. If desired, mid-chassis 65 may be omitted from device 10.

Mid-chassis 65 and/or conductive support plate 58 may extend across an entirety of the width of device 10 (e.g., between the left and right edges of device 10 as shown in FIG. 1). Mid-chassis 65 may be formed from an integral portion of peripheral conductive housing structures 12W that extends across the width of device 10 or may include a separate housing structures attached, coupled, or affixed (e.g., welded) to peripheral conductive housing structures 12W. Conductive support plate 58 may, if desired, be formed from a separate conductor than peripheral conductive housing structures 12W (e.g., conductive support plate 58 and peripheral conductive housing structures 12W are not formed from an integral piece of metal) to help facilitate removal of rear housing wall 12R, for example. One or more components may be supported by mid-chassis 65 and/or conductive support plate 58 (e.g., logic boards such as a main logic board, a battery, etc.). Mid-chassis 65 and/or conductive support plate 58 may contribute to the mechanical strength of device 10 (e.g., to prevent external twisting or bending forces from damaging device 10). Mid-chassis 65 and/or conductive support plate 58 may be formed from metal (e.g., stainless steel, aluminum, titanium, etc.).

Conductive support plate 58, mid-chassis 65, and/or display module 62 may have an edge 54 that is separated from peripheral conductive housing structures 12W by dielectric-filled slot 60 (sometimes referred to herein as opening 60, gap 60, or aperture 60). Slot 60 may be filled with air, plastic, ceramic, or other dielectric materials. Conductive housing structures such as conductive support plate 58, mid-chassis 65, conductive portions of display module 62, and/or peripheral conductive housing structures 12W (e.g., the portion of peripheral conductive housing structures 12W opposite conductive support plate 58, mid-chassis 65, and display module 62 at slot 60) may be used to form antenna structures for one or more of the antennas 40 in device 10. For example, peripheral conductive housing structures 12W may form an antenna resonating element arm (e.g., an inverted-F antenna resonating element arm) in the antenna resonating element 45 (FIG. 3) or may form a part of the antenna ground 49 (FIG. 3) of an antenna 40 in device 10. Mid-chassis 65, conductive support plate 58, and/or display module 62 may be used to form the antenna ground 49 (FIG. 3) for one or more of the antennas 40 in device 10 and/or to form one or more edges of slot antenna resonating elements for the antennas in device 10. One or more conductive interconnect structures 63 may electrically couple mid-chassis 65 to conductive support plate 58, one or more conductive interconnect structures 63 may electrically couple mid-chassis 65 to conductive structures in display module 62 (sometimes referred to herein as conductive display structures), and/or one or more conductive interconnect structures 63 may electrically couple conductive structures in display module 62 to conductive support plate 58 so that each of these elements form part of the antenna ground. The conductive structures in display module 62 may include a conductive frame, bracket, or support plate for display module 62, shielding layers in display module 62, ground traces in display module 62, pixel circuitry, etc.

Conductive interconnect structures 63 may serve to ground mid-chassis 65 to conductive support plate 58 and/or display module 62 (e.g., to ground conductive support plate 58 to the conductive display structures through mid-chassis 65) or may ground display module 62 directly to conductive support plate 58. Put differently, conductive interconnect structures 63 may hold the conductive structures in display module 62, mid-chassis 65, and/or conductive support plate 58 to a common ground or reference potential (e.g., as a system ground for device 10 that is used to form part of antenna ground 49 of FIG. 3). Conductive interconnect structures 63 may therefore sometimes be referred to herein as grounding structures 63, grounding interconnect structures 63, or vertical grounding structures 63. Conductive interconnect structures 63 may include conductive traces, conductive pins, conductive springs (e.g., y-springs or spring fingers), conductive prongs (e.g., conductive blades that mate with conductive spring fingers such as y-springs), conductive brackets, conductive screws, conductive clips, conductive tape, conductive wires, conductive traces, conductive foam, conductive adhesive, solder, welds, metal members (e.g., sheet metal members), contact pads, conductive vias, conductive portions of one or more components mounted to mid-chassis 65 and/or conductive support plate 58, and/or any other desired conductive interconnect structures.

Figure 5:
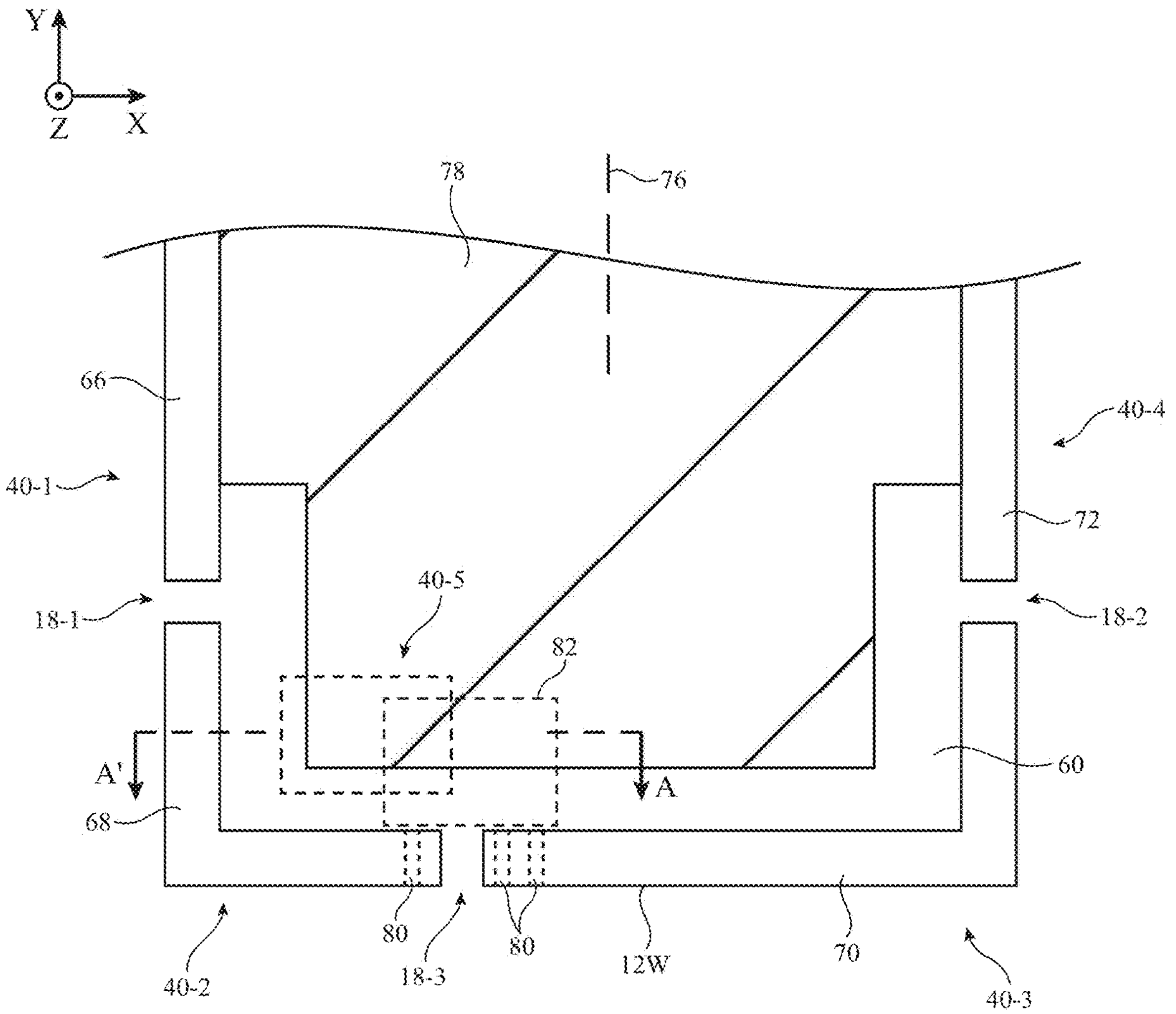
FIG. 5 is a top interior view of the lower end of an illustrative electronic device having an antenna overlapping vent structures at a corner of the electronic device in accordance with some embodiments.

If desired, device 10 may include multiple slots 60 and peripheral conductive housing structures 12W may include multiple dielectric gaps that divide the peripheral conductive housing structures into segments (e.g., dielectric gaps 18 of FIG. 1). FIG. 5 is a top interior view showing how the lower end of device 10 (e.g., within region 22 of FIG. 1) may include a slot 60 and may include multiple dielectric gaps that divide the peripheral conductive housing structures into segments for forming multiple antennas. Display 14 and other internal components have been removed from the view shown in FIG. 5 for the sake of clarity.

As shown in FIG. 5, peripheral conductive housing structures 12W may include a first conductive sidewall at the left edge of device 10, a second conductive sidewall at the top edge of device 10 (not shown in FIG. 5), a third conductive sidewall at the right edge of device 10, and a fourth conductive sidewall at the bottom edge of device 10 (e.g., in an example where device 10 has a substantially rectangular lateral shape). Peripheral conductive housing structures 12W may be segmented by dielectric-filled gaps 18 such as a first gap 18-1, a second gap 18-2, and a third gap 18-3. Gaps 18-1, 18-2, and 18-3 may be filled with plastic, ceramic, sapphire, glass, epoxy, or other dielectric materials. The dielectric material in the gaps may lie flush with peripheral conductive housing structures 12W at the exterior surface of device 10 if desired.

Gap 18-1 may divide the first conductive sidewall to separate segment 66 of peripheral conductive housing structures 12W from segment 68 of peripheral conductive housing structures 12W. Gap 18-2 may divide the third conductive sidewall to separate segment 72 from segment 70 of peripheral conductive housing structures 12W. Gap 18-3 may divide the fourth conductive sidewall to separate segment 68 from segment 70 of peripheral conductive housing structures 12W. In this example, when viewed from the front face of device 10, segment 68 forms the bottom-left corner of device 10 (e.g., segment 68 may have a bend at the corner) and is formed from the first and fourth conductive sidewalls of peripheral conductive housing structures 12W (e.g., in lower region 22 of FIG. 1). Segment 70 forms the bottom-right corner of device 10 (e.g., segment 70 may have a bend at the corner) and is formed from the third and fourth conductive sidewalls of peripheral conductive housing structures 12W (e.g., in lower region 22 of FIG. 1).

Device 10 may include ground structures 78 (e.g., structures that form part of the antenna ground for one or more of the antennas in device 10). Ground structures 78 may include one or more metal layers such as conductive support plate 58 (FIG. 4), mid-chassis 65 (FIG. 4), conductive display structures, conductive interconnect structures 63 (FIG. 4), conductive traces on one or more printed circuit boards, conductive portions of one or more components in device 10, etc. Ground structures 78 may extend between opposing sidewalls of peripheral conductive housing structures 12W. For example, ground structures 78 may extend from segment 66 to segment 72 of peripheral conductive housing structures 12W (e.g., across the width of device 10, parallel to the X-axis of FIG. 5). Ground structures 78 may be welded or otherwise affixed to segments 66 and 72. In another implementation, some or all of ground structures 78, segment 66, and segment 72 may be formed from a single, integral (continuous) piece of machined metal (e.g., in a unibody configuration). Device 10 may have a longitudinal axis 76 that bisects the width of device 10 and that runs parallel to the length of device 10 (e.g., parallel to the Y-axis).

As shown in FIG. 5, slot 60 may separate ground structures 78 from segments 68 and 70 of peripheral conductive housing structures 12W (e.g., the upper edge of slot 60 may be defined by ground structures 78 whereas the lower edge of slot 60 is defined by segments 68 and 70). Slot 60 may have an elongated shape extending from a first end at gap 18-1 to an opposing second end at gap 18-2 (e.g., slot 60 may span the width of device 10). Slot 60 may be filled with air, plastic, glass, sapphire, epoxy, ceramic, or other dielectric material. Slot 60 may be continuous with gaps 18-1, 18-2, and 18-3 in peripheral conductive housing structures 12W if desired (e.g., a single piece of dielectric material may be used to fill both slot 60 and gaps 18-1, 18-2, and 18-3).

Ground structures 78, segment 66, segment 68, segment 70, and portions of slot 60 may be used in forming multiple antennas 40 in the lower region of device 10 (sometimes referred to herein as lower antennas). For example, device 10 may include a first antenna 40-1 having an antenna resonating (radiating) element formed from segment 66 and/or a portion of slot 60 (e.g., a vertically extending end of slot 60 that extends parallel to longitudinal axis 76 and past gap 18-1, between segment 66 and ground structures 78) and having an antenna ground formed from ground structures 78. Device 10 may also include a second antenna 40-2 having an antenna resonating element (e.g., a resonating element arm) formed from segment 68 and having an antenna ground formed from ground structures 78. Device 10 may also include a third antenna 40-3 having an antenna resonating element (e.g., a resonating element arm) formed from segment 70 and having an antenna ground formed from ground structures 78. Device 10 may also include a fourth antenna 40-4 having a slot antenna resonating element formed from segment 72 and/or a portion of slot 60 between segment 72 and ground structures 78. Antennas 40-2 and 40-3 may be, for example, inverted-F antennas having return paths that couples the respective resonating element arms to the antenna ground. Device 10 may include a fifth antenna 40-5 at least partially overlapping the volume of antenna 40-2. Fifth antenna 40-5 may include an antenna resonating element arm formed from conductive traces on an underlying substrate and may have an antenna ground formed from ground structures 78, segment 66, and/or segment 72. Antennas 40-1, 40-2, 40-3, 40-4, and 40-5 may convey radio-frequency signals in one or more frequency bands (e.g., using MIMO communications in one or more of bands, thereby maximizing data throughput).

Antenna 40-5 may coexist with and/or may overlap other device structures such as vent structures 82. Vent structures 82 may be aligned with one or more openings (holes) 80 in segment 70 and/or segment 68 of peripheral conductive housing structures 12W. Vent structures 82 may include a microphone that receives sound (e.g., acoustic waves) through one or more of openings 80. Additionally or alternatively, vent structures 82 may include a barometric vent for device 10, in which one or more of openings 80 allows air to pass into and/or out of device 10 to equalize the internal air pressure of device 10 to the external air pressure around device 10 (e.g., to help optimize the mechanical integrity of device 10 under different air pressure conditions). Vent structures 82 may sometimes be referred to herein as vent module 82, microphone module 82, microphone 82, microphone box 82, barometric vent 82, barometric vent module 82, barometric vent structures 82, or simply as vent 82.

Vent structures 82 may include dielectric structures such as a vent substrate. The vent substrate may include (e.g., may surround an enclose) one or more interior cavities such as an acoustic chamber, a microphone chamber, a barometric port, an air cavity, etc. Vent structures 82 may also include conductive structures such as a vent cowling (sometimes also referred to as a vent bracket or vent frame). The vent cowling may be layered onto, attached to, affixed to, clipped to, and/or otherwise coupled to the vent substrate. The vent cowling may help to attach vent structures 82 to other device components such as a flexible or rigid printed circuit board, may help to ground one or more conductive structures in device 10 (e.g., may form part of the antenna ground for one or more antennas in device 10), may form an acoustic plate that modifies acoustic signals conveyed by vent structures 82, and/or may help to maximize the mechanical strength or integrity of vent structures 82 and/or device 10, as examples. Alternatively, vent structures 82 may be replaced with speaker structures and/or any other desired device structures having a conductive bracket, frame, or cowling.

In general, it may be desirable to provide antenna 40-5 with a compact form factor to minimize space consumption in device 10 (e.g., to maximize the amount of space in device 10 available for other components). However, the bandwidth of antenna 40-5 is generally directly proportional to the area or volume of antenna 40-5. In addition, if care is not taken, the presence of conductive material in the vicinity of antenna 40-5 (e.g., the vent cowling in vent structures 82, segment 68, segment 66, ground structures 78, etc.) can further make it difficult for antenna 40-5 to exhibit sufficient bandwidth for covering a desired frequency range while conveying radio-frequency signals through the rear housing wall of device 10 (e.g., for covering all of a first frequency band B1 such as a 5G frequency band between around 5000 MHz and 6000 MHz and/or all of a second frequency band B2 such as a Wi-Fi 6E frequency band between around 6000 MHz and 7200 MHz). To help mitigate these issues, antenna 40-5 may include one or more parasitic elements that broaden the bandwidth of antenna 40-5.

Figure 6:
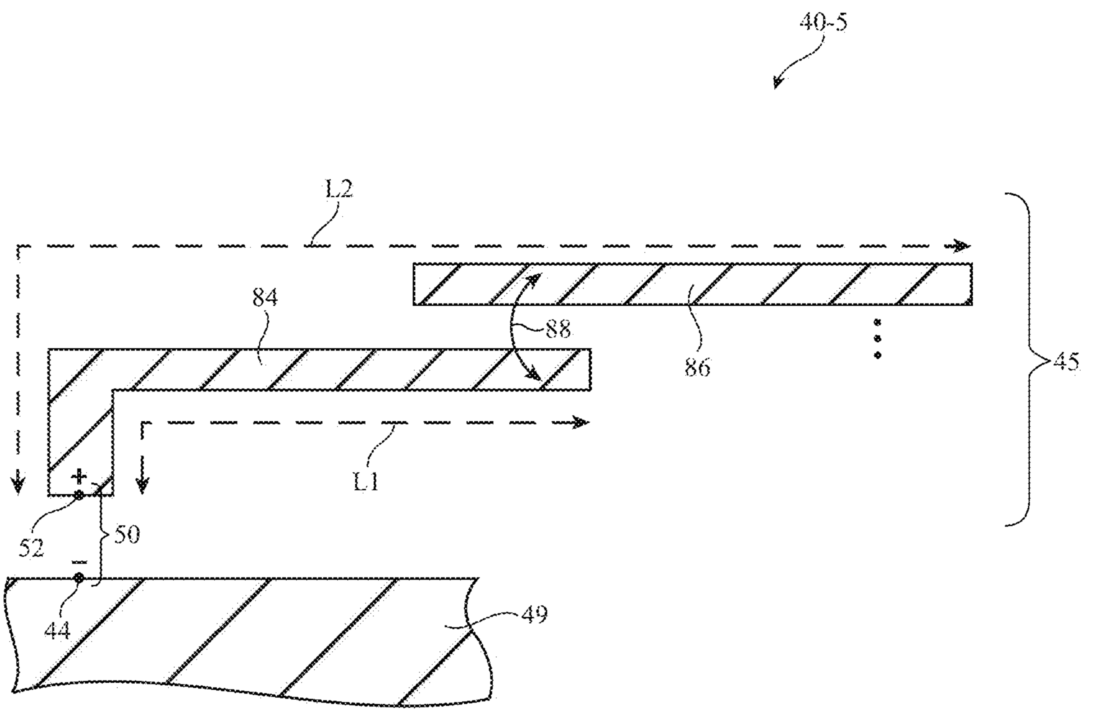
FIG. 6 is a schematic diagram of an illustrative antenna having a monopole antenna resonating element and a parasitic element in accordance with some embodiments.

FIG. 6 is a schematic diagram showing an example in which antenna 40-5 includes a monopole element and a parasitic element (e.g., an example in which antenna 40-5 is implemented as a monopole antenna having a parasitic element). As shown in FIG. 6, the antenna resonating element 45 of antenna 40-5 may include a monopole antenna resonating element such as monopole element 84 (sometimes also referred to herein as monopole 84, monopole arm 84, monopole radiator 84, monopole antenna resonating element 84, monopole antenna radiating element 84, monopole resonating element 84, monopole radiating element 84, monopole antenna element 84, monopole antenna arm 84, antenna arm 84, or antenna element 84).

Monopole element 84 extends from a first (proximal) end coupled to positive antenna feed terminal 52 of antenna feed 50 to an opposing second (distal) end. The first end of monopole element 84 may be separated from antenna ground 49 by a dielectric-filled gap. Antenna feed 50 may be coupled across the gap (e.g., ground antenna feed terminal 44 may be coupled to antenna ground 49 opposite positive antenna feed terminal 52).

Monopole element 84 may have a radiating length L1, measured from its first end to its second end. Radiating length L1 may be selected to configure antenna 40-5 to convey radio-frequency signals (e.g., to resonate or radiate) at a desired frequency (e.g., a center frequency of a corresponding frequency band). Radiating length L1 may be, for example, approximately equal to (e.g., within 10-25% of) one-half the effective wavelength corresponding to the desired frequency (e.g., where effective wavelength is equal to the free space wavelength multiplied by a constant associated with the dielectric material around antenna resonating element 45). Monopole element 84 may be linear (e.g., may follow a linear path), may be bent or folded (e.g., may be an L-shaped monopole element having a single fold or bend as shown in the example of FIG. 6), or may follow any desired path having any desired number of straight and/or curved segments extending from each other at any desired angles between the first and second ends. Monopole element 84 may have any desired number of straight and/or curved edges.

To increase the bandwidth of antenna 40-5, antenna resonating element 45 may include one or more parasitic elements such as parasitic element 86. Parasitic element 86 is sometimes also referred to herein as parasitic 86, parasitic arm 86, parasitic antenna resonating element 86, parasitic antenna radiating element 86, parasitic resonating element 86, parasitic radiating element 86, parasitic resonator 86, or parasitic radiator 86. At least some of parasitic element 86 may overlap at least some of monopole element 84 (e.g., at, overlapping, and/or adjacent to the second end of monopole element 84). Parasitic element 86 may be separated from monopole arm 84 by a dielectric-filled gap (e.g., a gap that is free of conductive material).

Monopole element 84 is a directly fed antenna element because monopole element 84 is galvanically connected to positive antenna feed terminal 52 (e.g., positive antenna feed terminal 52 is coupled to or disposed on monopole arm 84). Monopole element 84 is therefore sometimes also referred to herein as directly fed antenna element 84. Antenna current flows along a continuous conductive path between the radio-frequency transmission line path 42 for antenna 40-5 (FIG. 3) and monopole element 84 through or via positive antenna feed terminal 52.

Parasitic element 86 is an indirectly fed antenna element that is indirectly fed or excited by monopole arm 84. Parasitic element 86 is therefore sometimes also referred to herein as indirectly fed antenna element 86. Parasitic element 86 is not galvanically connected to positive antenna feed terminal 52, so antenna current does not flow along a continuous conductive path between positive antenna feed terminal 52 and parasitic element 86. On the other hand, monopole element 84 (e.g., the portion of monopole element 84 overlapping parasitic element 86) may indirectly feed parasitic element 86 via near-field electromagnetic coupling 88 across the gap between monopole element 84 and parasitic element 86.

In other words, during signal transmission, antenna current flowing on monopole element 84 may induce, via near-field electromagnetic coupling 88, corresponding antenna current to flow along parasitic element 86. The antenna current flowing on monopole element 84 and parasitic element 86 may radiate corresponding radio-frequency signals through rear housing wall 12R of device 10 (FIG. 4). During signal reception, incident radio-frequency signals may be received by antenna 40-5 through the rear housing wall. The incident radio-frequency signals may produce antenna current on monopole element 84 and parasitic element 86. Antenna current on parasitic element 86 may contribute to, via near-field electromagnetic coupling 88, a portion of the antenna current flowing on monopole element 84.

The length of parasitic element 86 may be selected to tune the bandwidth of antenna 40-5 (e.g., to cover the entirety of a desired frequency band). For example, the inclusion of parasitic element 86 in antenna 40-5 may configure antenna resonating element 45 to exhibit an extended radiating length L2 that is greater than radiating length L1. The combination of the radiative/resonant contribution(s) of monopole element 84 (e.g., in a fundamental mode and/or one or more harmonic modes) with the radiative/resonant contribution(s) of parasitic element 86 (e.g., in a fundamental mode and/or one or more harmonic modes) may collectively cause antenna 40-5 to exhibit a response that extends across the entirety of the desired frequency band (e.g., may serve to broaden the bandwidth of antenna 40-5 relative to implementations where parasitic element 86 is omitted). Parasitic element 86 may be linear (as shown in FIG. 6), may follow any desired path having any desired number of curved and/or straight segments extending at any desired angles between the first and second ends of parasitic element 86, and/or may have any desired number of straight and/or curved edges.

The example of FIG. 6 is illustrative and non-limiting. If desired, monopole element 84 may be replaced with any desired antenna resonating element (e.g., an inverted-F antenna resonating element arm, a patch antenna resonating element, a slot antenna resonating element, a dipole antenna resonating element arm, a loop antenna resonating element, etc.). If desired, antenna resonating element 45 may include more than two parasitic elements 86 (e.g., where a given parasitic element is indirectly fed by monopole element 84 and/or another parasitic element 86). The radiative response of antenna 40-5 may be given by the combination of the radiative responses of monopole element 84 and each of the parasitic elements and/or near-field electromagnetic couplings.

Figure 7:
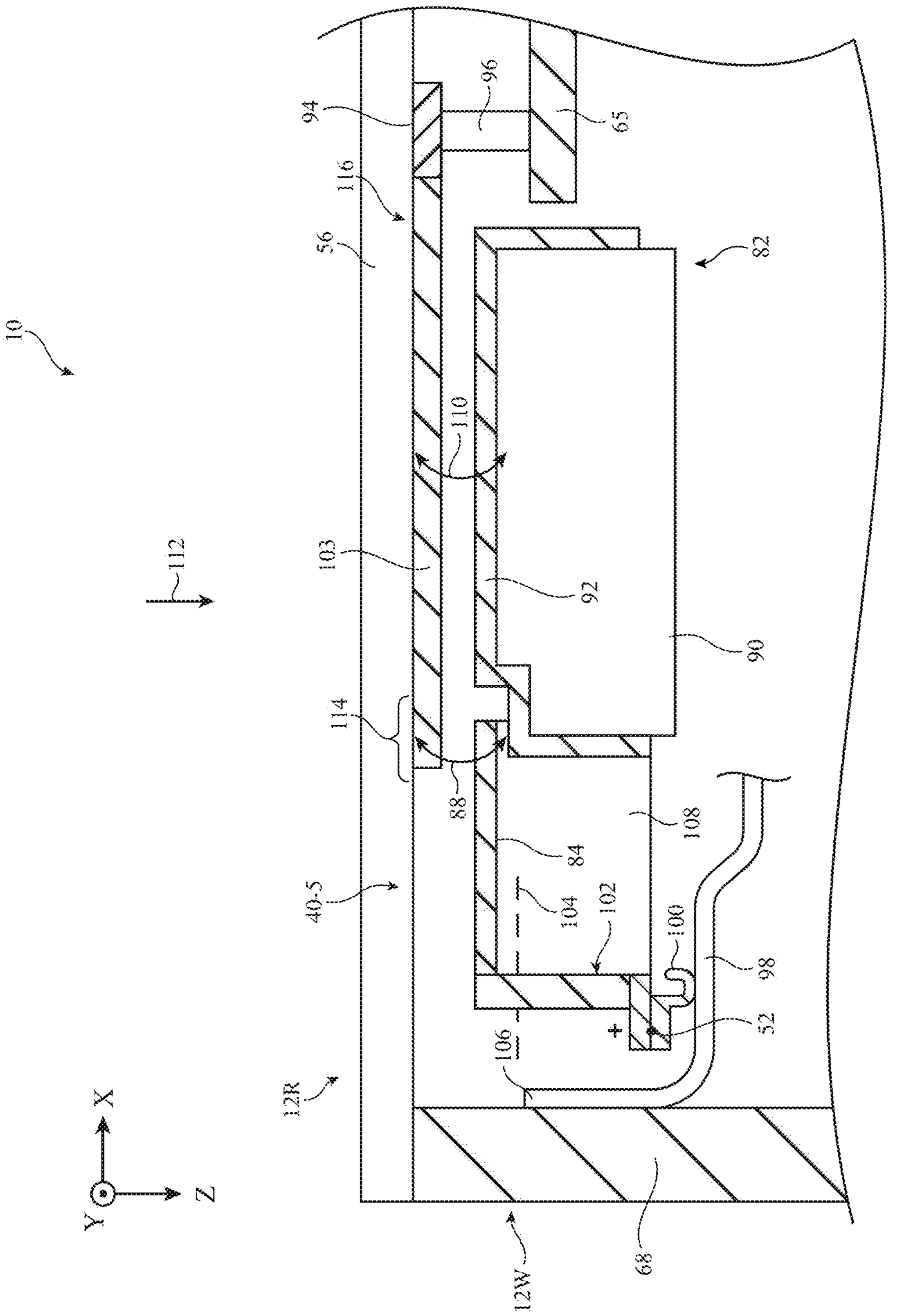
FIG. 7 is a cross-sectional side view of an illustrative electronic device having an antenna with a monopole antenna resonating element and a parasitic element, where the parasitic element is layered on a dielectric cover layer, overlaps a vent cowling, and is coupled to a conductive bracket on the dielectric cover layer in accordance with some embodiments.

Parasitic element 86 may be implemented using any desired conductive structures in device 10. FIG. 7 is a cross-sectional side view (e.g., as taken along line AA' of FIG. 5, with rear housing wall 12R of device 10 facing upwards on the page) showing one example in which parasitic element 86 includes a conductive trace on rear housing wall 12R.

As shown in FIG. 7, vent structures 82 may include a dielectric substrate such as vent substrate 90. Vent substrate 90 may be formed from plastic, ceramic, polymer, and/or other dielectric materials. Vent substrate 90 may include one or more interior cavities (not shown) such as an acoustic chamber, a microphone chamber, a barometric port, an air cavity, etc. Vent structures 82 may also include a conductive structure such a vent cowling 92 (sometimes also referred to conductive vent cowling 92, vent conductor 92, conductive vent bracket 92, vent bracket 92, conductive vent frame 92, or vent frame 92). Vent cowling 92 may be formed from conductive material such as stamped and/or folded sheet metal (e.g., aluminum, stainless steel, titanium, etc.). Vent cowling 92 may be disposed on vent substrate 90. Vent cowling 92 may, for example, be attached, affixed, clipped, adhered, and/or otherwise layered onto an exterior surface of vent substrate 90. If desired, some or all of vent cowling 92 may be embedded (e.g., molded) within vent substrate 90. Vent cowling 92 may extend across some or all of the lateral surface of vent substrate 90 facing rear housing wall 12R. If desired, vent cowling 92 may include portions, tabs, prongs, or arms that extend down one or more sidewalls of vent substrate 90.

Rear housing wall 12R may include a conductive bracket 94. Conductive bracket 94 may be attached, affixed, and/or adhered to an interior lateral surface of dielectric cover layer 56. Conductive bracket 94 is not electrically shorted or coupled to ground structures in device 10. Conductive bracket 94 may be coupled to mid-chassis 65 by dielectric interconnect 96. Dielectric interconnect 96 may be a dielectric screw, prong, tab, clip, fastener, and/or any other desired dielectric interconnect structure. If desired, conductive bracket 94 and/or mid-chassis 65 may include respective threaded screw holes/bosses for receiving dielectric interconnect 96 (e.g., in implementations where dielectric interconnect 96 includes a dielectric screw). Conductive bracket 94 and dielectric interconnect 96 may help to mechanically secure or attach rear housing wall 12R to mid-chassis 65, for example. Since dielectric interconnect 96 is formed from dielectric material, conductive bracket 94 is not electrically coupled to mid-chassis 65 and is electrically floating relative to ground. Conductive bracket 94 is sometimes also referred to herein as back glass bracket 94, conductive pad 94, or fang pad 94.

Device 10 may include a printed circuit board such as flexible printed circuit 98. Flexible printed circuit 98 may include signal traces that form the signal conductor(s) of the radio-frequency transmission line path(s) 42 (FIG. 3) for one or more antennas 40 in device 10 such as at least antenna 40-5 and optionally an antenna having an antenna resonating element formed from segment 68 of peripheral conductive housing structures 12W (e.g., antenna 40-2 of FIG. 5). Flexible printed circuit 98 may also include ground traces that form part of the antenna ground 49 (FIG. 3) for one or more antennas 40 in device 10 such as at least antenna 40-5. If desired, flexible printed circuit 98 may have a tail 106 that is folded towards rear housing wall 12R and that extends along segment 68 of peripheral conductive housing structures 12W. Tail 106 may be coupled, attached, affixed, and/or screwed to segment 68. A signal trace on tail 106 may be coupled to segment 68 (e.g., at the positive antenna feed terminal for antenna 40-2 of FIG. 5) and/or a ground trace on tail 106 may be coupled to segment 68 (e.g., to form a short circuit or return path for antenna 40-2 of FIG. 5).

As shown in FIG. 7, antenna 40-5 may have a monopole element 84 disposed between vent structures 82, segment 68, and/or rear housing wall 12R. Monopole element 84 may, for example, be formed from conductive traces and/or one or more sheet metal members that are disposed on and/or within a dielectric support structure such as substrate 108. Substrate 108 is sometimes also referred to herein as dielectric support structure 108, dielectric substrate 108, dielectric antenna carrier 108, or antenna carrier 108. Substrate 108 may be formed from plastic, polymer, ceramic, or other dielectric materials. Substrate 108 may be a different substrate than vent substrate 90 or may, if desired, be formed from an extension of vent substrate 90 (e.g., substrate 108 and vent substrate 90 may be different portions of a single integral dielectric substrate).

If desired, monopole element 84 may have a segment 102 that is folded away from rear housing wall 12R about axis 104. Segment 102 may extend down a sidewall of substrate 108. A conductive interconnect structure 100 (e.g., a conductive spring finger) may be coupled to the end of segment 102 (e.g., the first end of monopole element 84) at positive antenna feed terminal 52. Conductive interconnect structure 100 may couple segment 102 and positive antenna feed terminal 52 to a signal trace on flexible printed circuit 98 that forms part of the radio-frequency transmission line path 42 (FIG. 3) used to feed antenna 40-5 (e.g., at a corresponding contact pad on flexible printed circuit 98).

Rear housing wall 12R may include one or more conductive traces patterned onto the interior lateral surface of dielectric cover layer 56, such as conductive trace 103. Conductive trace 103 may be formed from copper, gold, nickel, a mesh or grid of a transparent conductor such as indium tin oxide (ITO), and/or other conductive materials. Conductive trace 103 may extend from a first end facing segment 68 and/or monopole element 84 to an opposing second end 116 facing conductive bracket 94. A portion 114 of conductive trace 103 is located at the first end of conductive trace 103. Conductive trace 103 may overlap vent cowling 92.

Monopole element 84 may include an additional segment that extends away from segment 102 to the second end of monopole element 84. The second end of monopole element 84 and/or a portion of monopole element 84 located at and/or adjacent to the second end of monopole element 84 may overlap the first end and portion 114 of conductive trace 103 (e.g., when viewed in the direction of arrow 112). Monopole element 84 may be vertically separated from conductive trace 103 by a dielectric gap (e.g., an air gap). Conductive trace 103 may form a parasitic element 86 of antenna 40-5 (FIG. 6). Monopole element 84 may indirectly feed conductive trace 103 (parasitic element 86 of FIG. 6) via near-field electromagnetic coupling 88 across the dielectric gap. This serves to extend the radiating length of antenna 40-5 to include conductive trace 103 in addition to monopole element 84, which increases the bandwidth of antenna 40-5 relative to implementations where parasitic element 86 (FIG. 6) is omitted.

Vent cowling 92 may be vertically separated from rear housing wall 12R and conductive trace 103 by a dielectric gap (e.g., an air gap). If desired, vent cowling 92 may also contribute to the radiative response of antenna 40-5. For example, conductive trace 103 may indirectly feed/excite vent cowling 92 via near-field electromagnetic coupling 110. In other words, vent cowling 92 may form an additional parasitic element 86 (FIG. 6) for antenna 40-5, helping to further broaden the bandwidth of antenna 40-5.

In the example of FIG. 7, second end 116 of conductive trace 103 is coupled to conductive bracket 94 (e.g., is galvanically and electrically shorted to conductive bracket 94). This may further extend the radiating length of antenna 40-5 to further increase the bandwidth of antenna 40-5. In this example, conductive trace 103 and conductive bracket 94 both form part of the parasitic element 86 (FIG. 6) for antenna 40-5. Dielectric interconnect 96 may prevent antenna currents on the parasitic element from shorting to mid-chassis 65 and the antenna ground for antenna 40-5.

Figure 8:
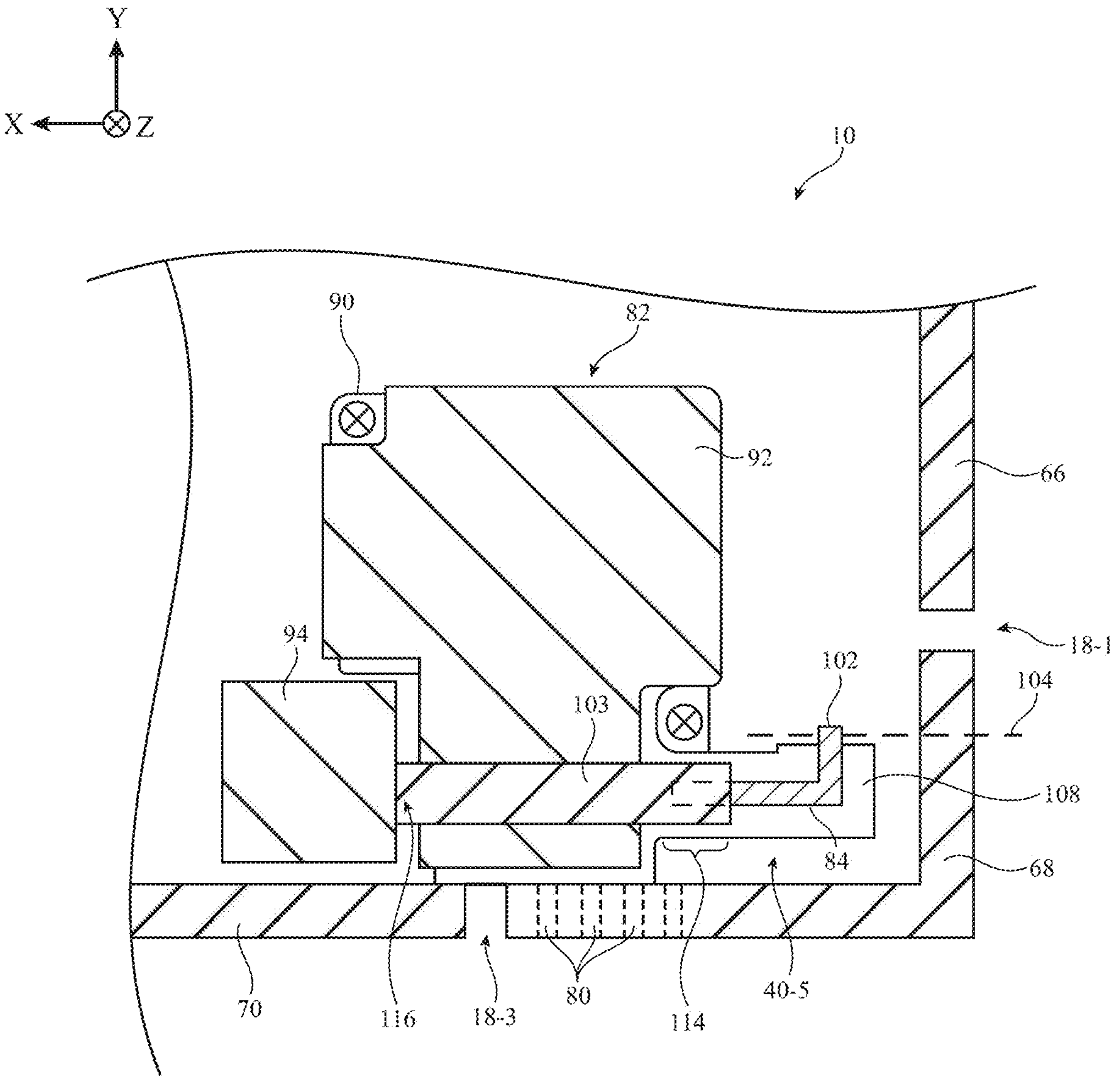
FIG. 8 is a rear interior view of a corner of an illustrative electronic device provided with an antenna of the type shown in FIG. 7 in accordance with some embodiments.

FIG. 8 is an interior bottom view of antenna 40-5 of FIG. 7 (e.g., as taken in the direction of arrow 112 of FIG. 7). In the example of FIG. 8, dielectric cover layer 56, mid-chassis 65, dielectric interconnect 96, conductive interconnect structure 100, and flexible printed circuit 98 of FIG. 7 have been omitted for the sake of clarity.

As shown in FIG. 8, monopole element 84 may extend along a lateral surface of substrate 108. Segment 102 of monopole element 84 may be folded, wrapped, or bent around axis 104 and may extend along a sidewall of substrate 108. In the example of FIG. 8, axis 104 is parallel to the X-axis (e.g., substrate 108 is laterally interposed between segment 102 and the bottom edge of device 10). This is illustrative and non-limiting. If desired, segment 102 may be laterally interposed between the bottom edge of device 10 and substrate 108 or axis 104 may extend parallel to the Y-axis. Monopole element 84 may have any desired shape and may follow any desired path.

Portion 114 of conductive trace 103 may overlap the second end and a portion of monopole element 84 (e.g., a portion of monopole element 84 on the lateral surface of substrate 108). Second end 116 of conductive trace 103 is connected to conductive bracket 94. Vent cowling 92 may be layered onto a lateral surface of vent substrate 90. Conductive trace 103 may overlap a portion of vent cowling 92. One or more conductive screws may attach vent structures 82 to an underlying substrate (e.g., flexible printed circuit 98 of FIG. 7 or a separate printed circuit such as a dock flex). If desired, one or more of the screws may electrically short vent cowling 92 to other ground structures (e.g., holding vent cowling 92 at a ground potential to form part of the antenna ground for antenna 40-5 and/or other antennas in device 10). Vent structures 82 may be aligned with openings 80 in segment 70 and/or segment 70 (FIG. 5) to allow air to pass between the exterior of device 10 and one or more interior cavities within vent substrate 90. In the example of FIG. 8, conductive trace 103 follows a linear path. This is illustrative and, in general, conductive trace 103 may follow any desired path having any desired number of straight and/or curved segments and/or may have any desired number of curved and/or straight edges.

The example of FIGS. 7 and 8 in which conductive trace 103 is shorted to conductive bracket 94 is illustrative and non-limiting. If desired, conductive trace 103 may be laterally separated from conductive bracket 94 by a dielectric-filled gap 118, as shown in the cross-sectional side view of FIG. 9. Dielectric-filled gap 118 (e.g., an air gap) may separate second end 116 of conductive trace 103 from conductive bracket 94 (e.g., may form an infinite, open circuit impedance between conductive trace 103 and conductive bracket 94 at the frequencies of operation of antenna 40-5). This serves to prevent conductive bracket 94 from forming a part of the parasitic element 86 (FIG. 6) for antenna 40-5. Since conductive bracket 94 is electrically floating (e.g., is not shorted to mid-chassis 65), conductive bracket 94 does not contribute substantial capacitive loading to conductive trace 103 and does not substantially contribute to the radiative response of antenna 40-5.

Figure 9:
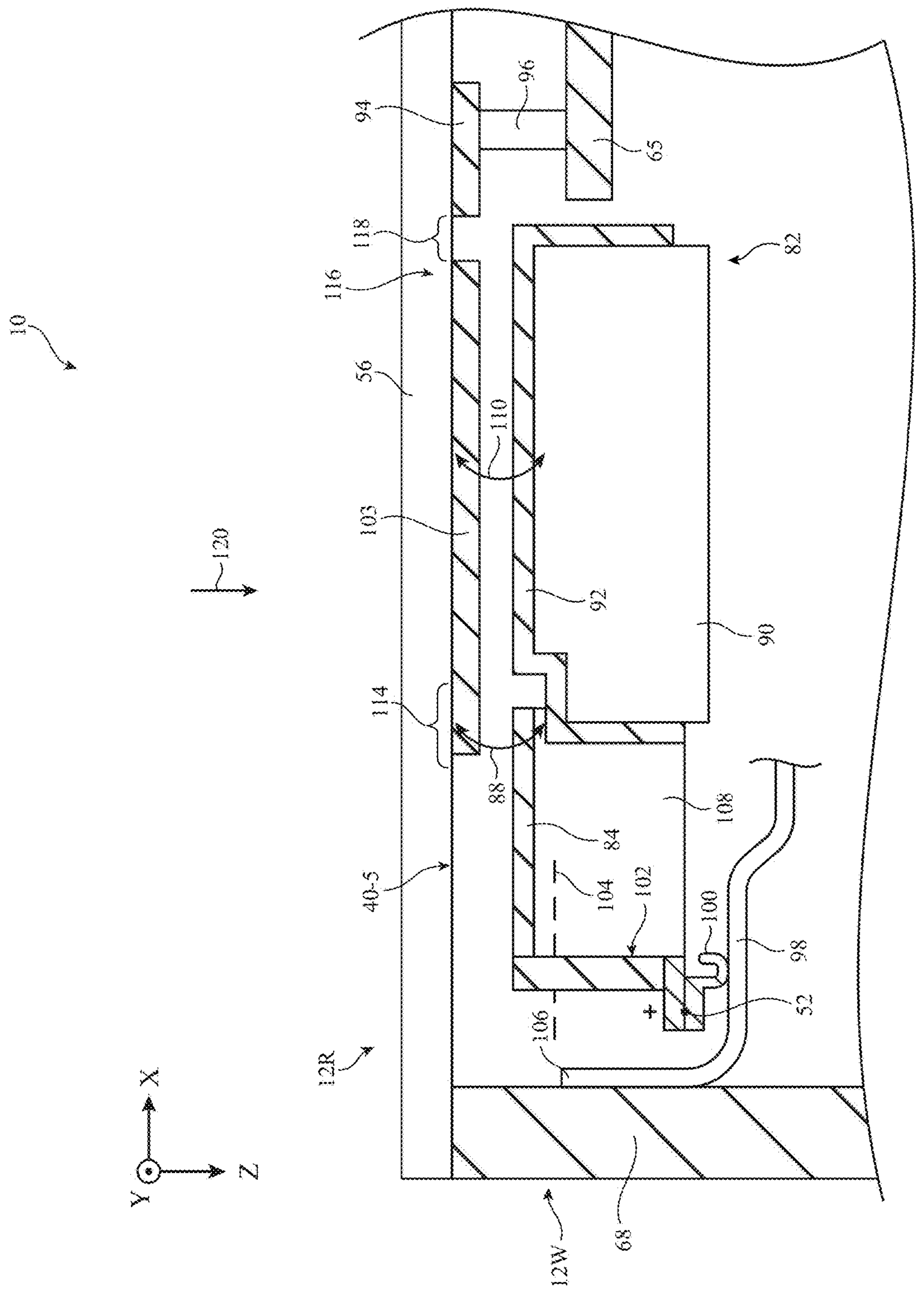
FIG. 9 is a cross-sectional side view of an illustrative electronic device having an antenna with a monopole antenna resonating element and a parasitic element, where the parasitic element is layered on a dielectric cover layer, overlaps a vent cowling, and is separated from a bracket on the dielectric cover layer by a gap in accordance with some embodiments.
Figure 10:
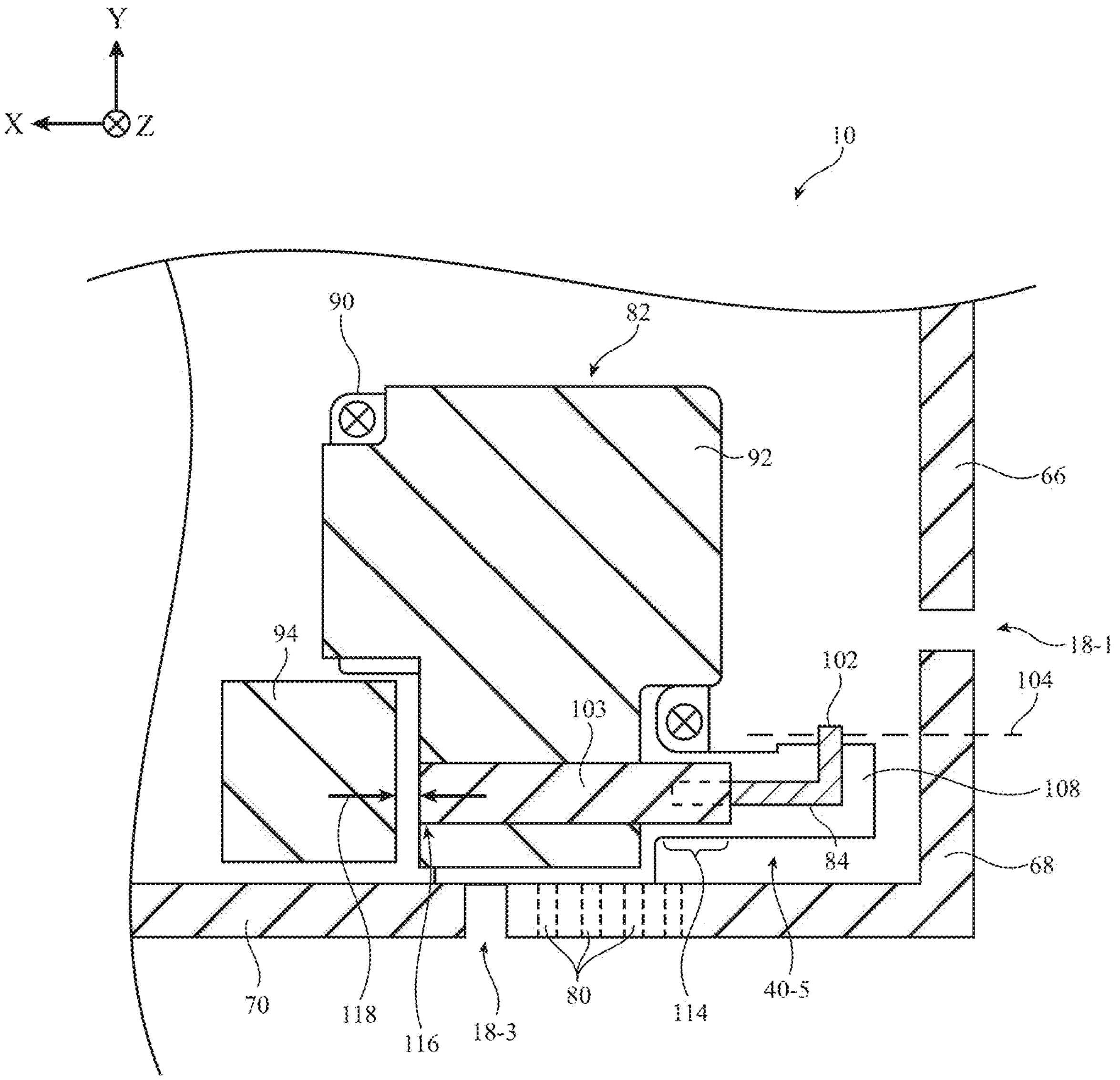
FIG. 10 is a rear interior view of a corner of an illustrative electronic device provided with an antenna of the type shown in FIG. 9 in accordance with some embodiments.

FIG. 10 is an interior bottom view of antenna 40-5 of FIG. 9 (e.g., as taken in the direction of arrow 120 of FIG. 9). In the example of FIG. 10, dielectric cover layer 56, mid-chassis 65, dielectric interconnect 96, conductive interconnect structure 100, and flexible printed circuit 98 of FIG. 9 have been omitted for the sake of clarity. As shown in FIG. 10, dielectric-filled gap 118 may laterally separate second end 116 of conductive trace 103 from conductive bracket 94 (e.g., dielectric-filled gap 118 may space second end 116 of conductive trace 103 apart from conductive bracket 94). Dielectric-filled gap 118 may be filled with air, glass, plastic, epoxy, polymer, adhesive, dielectric foam, and/or or other dielectric materials.

The examples of FIGS. 7-10 in which monopole element 84 indirectly feeds conductive trace 103 are illustrative and non-limiting. Alternatively, or in addition, monopole element 84 may indirectly feed (excite) a portion of vent cowling 92 via near-field electromagnetic coupling, as illustrated in the cross-sectional side view of FIG. 11.

Figure 11:
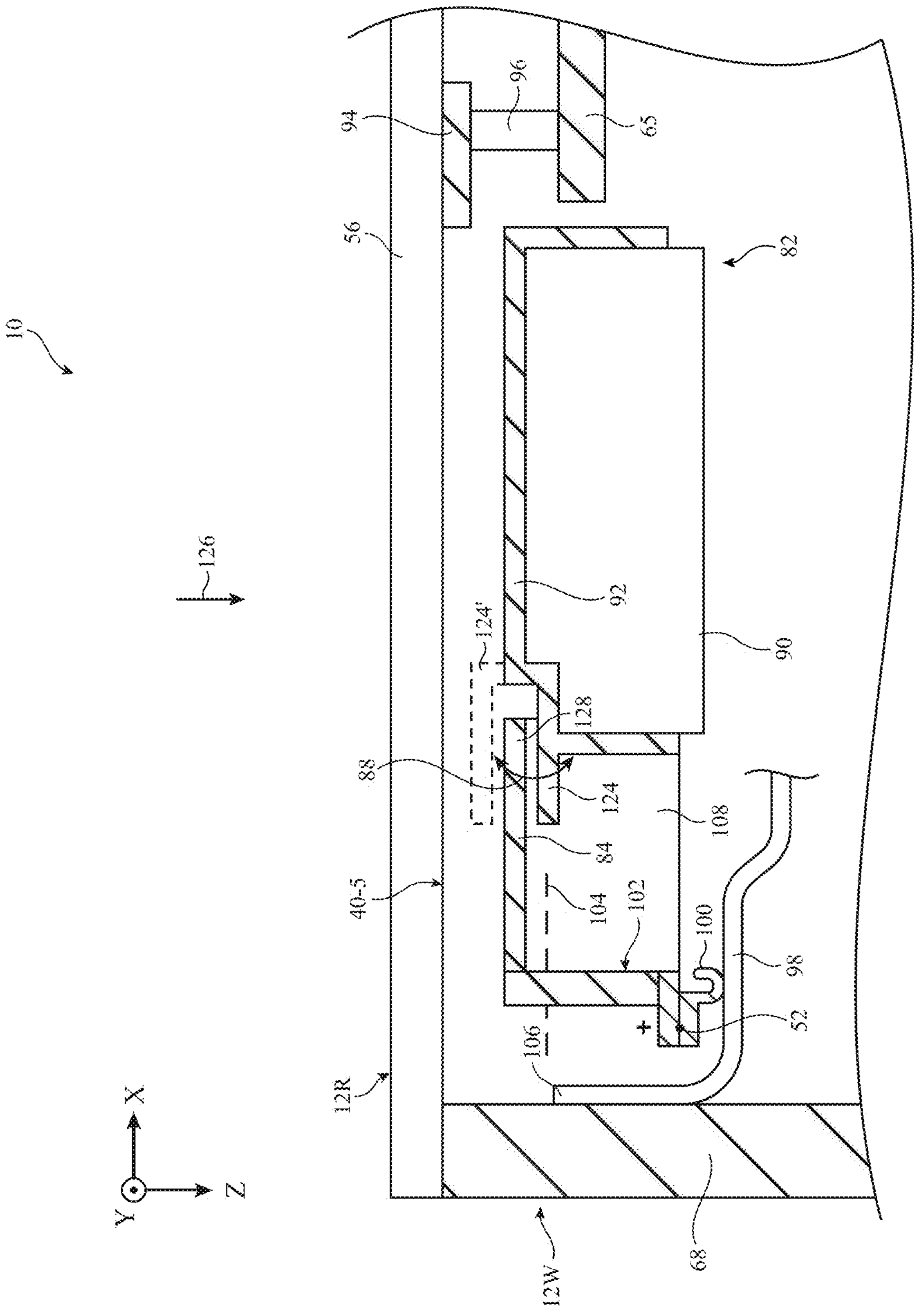
FIG. 11 is a cross-sectional side view of an illustrative electronic device having an antenna with a monopole antenna resonating element and a parasitic element, where the parasitic element is formed from an extension of a vent cowling in accordance with some embodiments.

As shown in FIG. 11, vent cowling 92 may include a vent cowling extension such as extension 124 (sometimes also referred to as tab 124, prong 124, finger 124, or portion 124 of vent cowling 92). Extension 124 may overlap the second end and a portion of monopole element 84. Extension 124 may be vertically separated from monopole element 84 by a dielectric-filled gap. Monopole element 84 may indirectly feed extension 124 and thus vent cowling 92 via near-field electromagnetic coupling 88 across the dielectric-filled gap. This may configure extension 124 and vent cowling 92 to form a parasitic element 86 (FIG. 6) for antenna 40-5, which may serve to broaden the bandwidth of antenna 40-5.

In the example of FIG. 11, monopole element 84 is vertically interposed between extension 124 and rear housing wall 12R. Additionally or alternatively, vent cowling 92 may include an extension 124' that is vertically interposed between monopole element 84 and rear housing wall 12R and that is indirectly fed by monopole element 84. Conductive trace 103 (FIGS. 7-10) may be omitted from rear housing wall 12R in this implementation (as illustrated in the example of FIG. 11) or, if desired, antenna 40-5 may include extension 124 and/or extension 124' in addition to conductive trace 103 on rear housing wall 12R, which may be shorted to conductive bracket 94 (as shown in FIGS. 7 and 8) or which may be separated from conductive bracket 94 by dielectric filled gap 118 (as shown in FIGS. 9 and 10). Put differently, the implementations of FIGS. 7-11 may be combined in any desired manner, such that antenna 40-5 includes at least one parasitic element 86 formed from conductive trace 103, conductive bracket 94, vent cowling 92, extension 124, and/or extension 124'.

Figure 12:
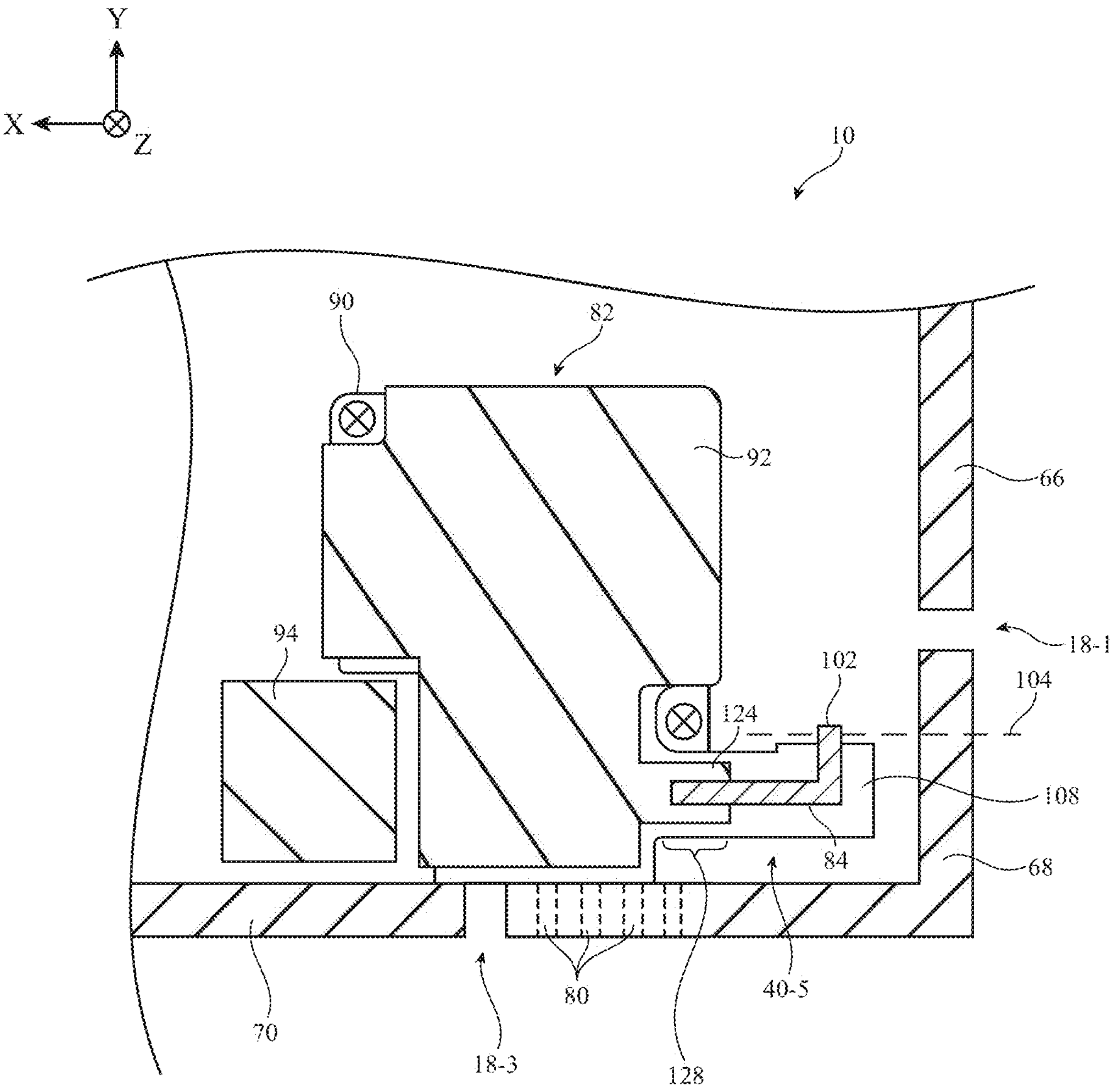
FIG. 12 is a rear interior view of a corner of an illustrative electronic device provided with an antenna of the type shown in FIG. 11 in accordance with some embodiments.

FIG. 12 is an interior bottom view of antenna 40-5 of FIG. 11 (e.g., as taken in the direction of arrow 126 of FIG. 11). In the example of FIG. 12, dielectric cover layer 56, mid-chassis 65, dielectric interconnect 96, conductive interconnect structure 100, and flexible printed circuit 98 of FIG. 9 have been omitted for the sake of clarity. As shown in FIG. 12, extension 124 of vent cowling 92 may overlap a portion 128 of monopole element 84 at or adjacent the second end of monopole element 84.

Figure 13:
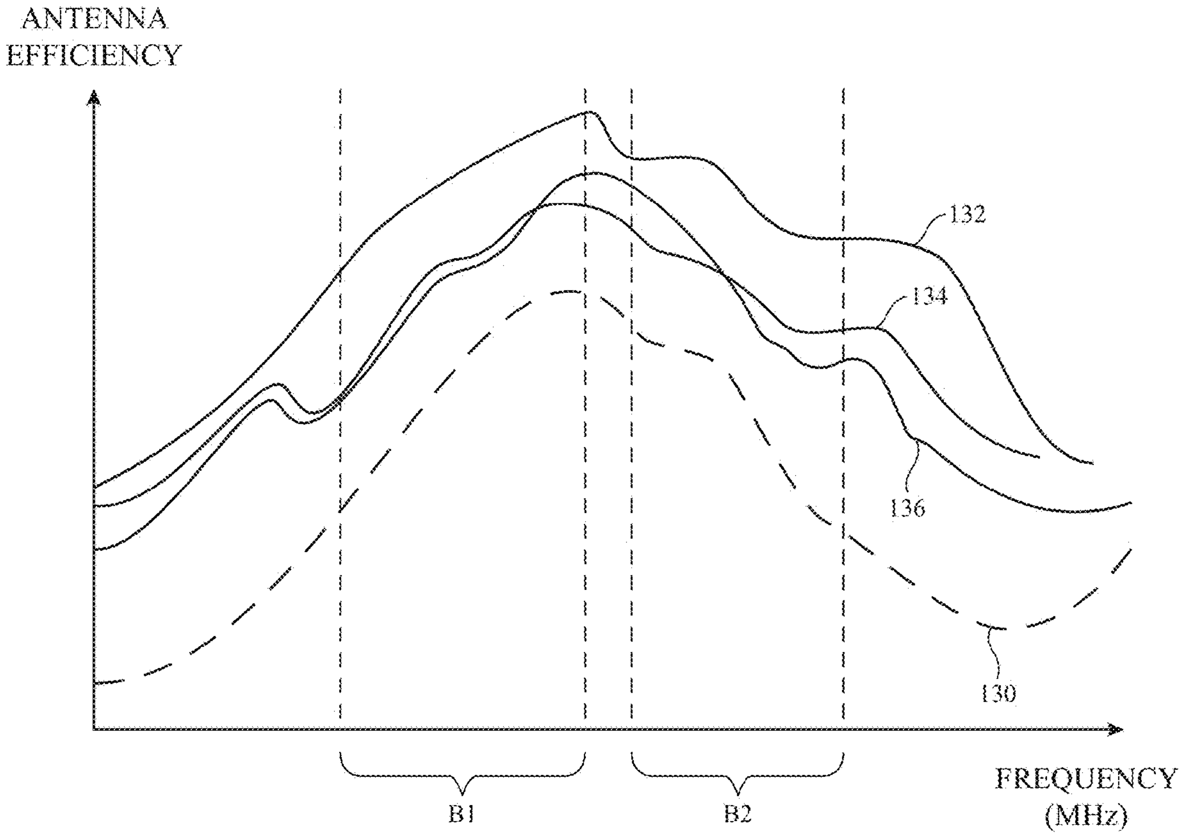
FIG. 13 is a plot of antenna performance (antenna efficiency) as a function of frequency for illustrative antennas of the types shown in FIGS. 7-12 in accordance with some embodiments.

FIG. 13 is a plot of antenna performance (antenna efficiency) as a function of frequency for antenna 40-5. Dashed curve 130 plots the antenna efficiency of antenna 40-5 in implementations where antenna 40-5 does not include any parasitic element 86 (FIG. 6). Curve 136 plots the antenna efficiency of antenna 40-5 in implementations where antenna 40-5 includes a parasitic element 86 formed from extension 124 and/or extension 124' of vent cowling 92 (FIGS. 10 and 11). Curve 134 plots the antenna efficiency of antenna 40-5 in implementations where antenna 40-5 includes a parasitic element 86 formed from a conductive trace 103 that is separated from conductive bracket 94 by dielectric-filled gap 118 (FIGS. 9 and 10). Curve 132 plots the antenna efficiency of antenna 40-5 in implementations where antenna 40-5 includes a parasitic element 86 formed from a conductive trace 103 that is coupled to conductive bracket 94 (FIGS. 7 and 8).

As shown by curves 130-136, the inclusion of one or more parasitic elements 86 (FIG. 6) in antenna 40-5 may serve to boost the antenna efficiency of antenna 40-5 across both a first frequency band B1 (e.g., a 5G band around 5000 MHz and 6000 MHz) and a second frequency band B2 (e.g., a Wi-Fi 6E frequency band between around 6000 MHz and 7200 MHz). Put differently, parasitic element(s) 86 may serve to increase the bandwidth of antenna 40-5 (e.g., such that antenna 40-5 exhibits more than a threshold antenna efficiency across a wider range of frequencies). As shown by curves 132-136, extending a given parasitic element 86 to include both conductive trace 103 and conductive bracket 94 may serve to maximize antenna efficiency across bands B1 and B2. The example of FIG. 13 is illustrative and, in practice, curves 130-136 may have other shapes. Antenna 40-5 may cover any desired frequency bands. Monopole element 84 of FIGS. 6-12 may be replaced with any desired type of antenna resonating element.

As used herein, the term "concurrent" means at least partially overlapping in time. In other words, first and second events are referred to herein as being "concurrent" with each other if at least some of the first event occurs at the same time as at least some of the second event (e.g., if at least some of the first event occurs during, while, or when at least some of the second event occurs). First and second events can be concurrent if the first and second events are simultaneous (e.g., if the entire duration of the first event overlaps the entire duration of the second event in time) but can also be concurrent if the first and second events are non-simultaneous (e.g., if the first event starts before or after the start of the second event, if the first event ends before or after the end of the second event, or if the first and second events are partially non-overlapping in time). As used herein, the term "while" is synonymous with "concurrent."

Device 10 may gather and/or use personally identifiable information. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing is illustrative and various modifications can be made by those skilled in the art without departing from the scope and spirit of the described embodiments. The foregoing embodiments may be implemented individually or in any combination.

What is claimed is:

1. An electronic device comprising:
peripheral conductive housing structures;
a display mounted to the peripheral conductive housing structures;
a dielectric cover layer mounted to the peripheral conductive housing structures opposite the display;
a vent aligned with openings in the peripheral conductive housing structures and including a conductive cowling;
an antenna arm coupled to a positive antenna feed terminal; and
a parasitic element that is indirectly fed by the antenna arm, wherein the parasitic element overlaps a portion of the conductive cowling and overlaps a portion of the antenna arm.

2. The electronic device of claim 1, wherein the parasitic element is layered onto the dielectric cover layer.

3. The electronic device of claim 2, wherein the parasitic element comprises a conductive trace on an interior surface of the dielectric cover layer.

4. The electronic device of claim 3, further comprising:
a conductive bracket on the interior surface of the dielectric cover layer.

5. The electronic device of claim 4, wherein the conductive trace extends from a first end overlapping the antenna arm to an opposing second end that is coupled to the conductive bracket, the parasitic element comprising the conductive bracket.

6. The electronic device of claim 4, wherein the conductive trace extends from a first end overlapping the antenna arm to an opposing second end that is laterally separated from the conductive bracket by a dielectric-filled gap.

7. The electronic device of claim 1, further comprising:
a first dielectric substrate, the conductive cowling being layered onto the first dielectric substrate;
a second dielectric substrate, the antenna arm being disposed on at least two sides of the second dielectric substrate;
a flexible printed circuit that includes a signal trace and that has a tail coupled to the peripheral conductive housing structures; and
a conductive spring finger that couples the signal trace to the antenna arm at the positive antenna feed terminal.

8. The electronic device of claim 1, wherein the antenna arm comprises a monopole antenna resonating element.

9. The electronic device of claim 1, wherein the parasitic element is separated from the antenna arm and the conductive cowling by a dielectric-filled gap, the antenna arm is configured to feed the parasitic element via a first near-field electromagnetic coupling across the dielectric-filled gap, and the parasitic element is configured to indirectly feed the conductive cowling via a second near-field electromagnetic coupling across the dielectric-filled gap.

10. An electronic device comprising:
peripheral conductive housing structures;
a display mounted to the peripheral conductive housing structures;
a dielectric cover layer mounted to the peripheral conductive housing structures opposite the display;
a conductive trace on an interior surface of the dielectric cover layer;
a conductive bracket on the interior surface of the dielectric cover layer; and
an antenna, wherein the antenna includes
an antenna element coupled to a positive antenna feed terminal, and
a parasitic element that includes the conductive trace and the conductive bracket.

11. The electronic device of claim 10, wherein the parasitic element extends from a first end overlapping the antenna element to an opposing second end that is electrically shorted to the conductive bracket.

12. The electronic device of claim 11, further comprising:
a conductive chassis coupled to the peripheral conductive housing structures, wherein the conductive chassis is interposed between the display and the dielectric cover layer; and
a dielectric interconnect that couples the conductive bracket to the conductive chassis.

13. The electronic device of claim 10, further comprising:
a microphone aligned with holes in the peripheral conductive housing structures, wherein the microphone has a conductive frame that at least partially overlaps the conductive trace.

14. The electronic device of claim 13, wherein the antenna further comprises:

an additional parasitic element that includes the conductive frame, the antenna element being configured to indirectly feed the parasitic element via a first near-field electromagnetic coupling, and the parasitic element being configured to indirectly feed the additional parasitic element via a second near-field electromagnetic coupling.

15. The electronic device of claim 10, further comprising:

a barometric vent aligned with holes in the peripheral conductive housing structures, wherein the barometric vent has a conductive frame that at least partially overlaps the conductive trace.

16. The electronic device of claim 4, further comprising:

a conductive chassis coupled to the peripheral conductive housing structures, wherein the conductive chassis is interposed between the display and the dielectric cover layer; and a dielectric interconnect that couples the conductive bracket to the conductive chassis.

17. The electronic device of claim 16, wherein the conductive trace extends from a first end overlapping the antenna arm to an opposing second end that is coupled to the conductive bracket, the parasitic element comprising the conductive bracket.

18. An electronic device comprising:

a housing that includes a dielectric cover layer;

a conductive trace on a surface of the dielectric cover layer;

a conductive cowling; and an antenna that includes an antenna arm, a first parasitic that includes the conductive trace, and a second parasitic that includes the conductive cowling.

19. The electronic device of claim 18, wherein the antenna arm is configured to excite the first parasitic and the second parasitic via one or more near-field electromagnetic couplings.

20. The electronic device of claim 18, further comprising a vent, wherein the conductive cowling is layered on the vent.

* * * * *